(12) United States Patent
Weller et al.

(10) Patent No.: US 8,299,181 B2
(45) Date of Patent: Oct. 30, 2012

(54) PROCESS FOR THE PRODUCTION OF CROSSLINKED POLYMER EMPLOYING LOW VOC-PRODUCING SILANE CROSSLINKER AND RESULTING CROSSLINKED POLYMER

(75) Inventors: Keith J. Weller, North Greenbush, NY (US); Philbert E. Ramdatt, New York, NY (US)

(73) Assignee: Momentive Performance Materials, Inc., Albany, NY (US)

( * ) Notice: Subject to any disclaimer, the term of this patent is extended or adjusted under 35 U.S.C. 154(b) by 774 days.

(21) Appl. No.: 12/389,731

(22) Filed: Feb. 20, 2009

(65) Prior Publication Data
US 2009/0182094 A1 Jul. 16, 2009

Related U.S. Application Data

(63) Continuation of application No. 11/975,399, filed on Oct. 19, 2007, now Pat. No. 7,511,100, which is a continuation of application No. 11/280,770, filed on Nov. 16, 2005, now Pat. No. 7,326,753.

(60) Provisional application No. 60/651,112, filed on Feb. 8, 2005.

(51) Int. Cl.
C08F 242/00 (2006.01)
C08F 8/00 (2006.01)
C07F 7/04 (2006.01)

(52) U.S. Cl. ......... 525/190; 525/193; 525/288; 556/449
(58) Field of Classification Search .................. 556/400, 556/406, 457, 458, 449; 525/190, 193, 288
See application file for complete search history.

(56) References Cited

U.S. PATENT DOCUMENTS

| | | | |
|---|---|---|---|
| 3,313,773 A | 4/1967 | Lamoreaux | |
| 3,646,155 A | 2/1972 | Scott | |
| 4,117,195 A | 9/1978 | Swarbrick et al. | |
| 4,144,202 A | 3/1979 | Ashcraft et al. | |
| 4,247,498 A | 1/1981 | Castro | |
| 4,252,906 A | 2/1981 | Hosokawa et al. | |
| 4,412,042 A | 10/1983 | Matsuura et al. | |
| 4,413,066 A | 11/1983 | Isaka et al. | |
| 4,500,648 A | 2/1985 | Malpass | |
| 4,798,081 A | 1/1989 | Hazlitt et al. | |
| 4,806,575 A | 2/1989 | Waller et al. | |
| 4,950,541 A | 8/1990 | Tabor et al. | |
| 5,112,919 A | 5/1992 | Furrer et al. | |
| 5,246,783 A | 9/1993 | Spenadel et al. | |
| 5,272,236 A | 12/1993 | Lai et al. | |
| 5,278,272 A | 1/1994 | Lai et al. | |
| 5,380,810 A | 1/1995 | Lai et al. | |
| 5,539,075 A | 7/1996 | Gustafsson et al. | |
| 5,741,858 A | 4/1998 | Brann et al. | |
| 5,744,553 A | 4/1998 | Kempter | |
| 5,912,313 A | 6/1999 | McIntosh et al. | |
| 5,981,674 A | 11/1999 | Schombourg et al. | |
| 6,455,637 B1 | 9/2002 | Jackson et al. | |
| 6,624,236 B1 | 9/2003 | Bissinger et al. | |
| 2005/0192387 A1 | 9/2005 | Williams et al. | |
| 2005/0245753 A1* | 11/2005 | Cruse et al. ................. 556/413 |
| 2006/0041063 A1 | 2/2006 | Cruse et al. | |

FOREIGN PATENT DOCUMENTS

| | | |
|---|---|---|
| EP | 0211154 | 2/1987 |
| EP | 0220809 A2 | 5/1987 |
| EP | 0994151 A1 | 4/2000 |
| GB | 964428 | 7/1964 |
| RU | 2123016 | 12/1998 |
| WO | WO9945072 A1 | 9/1999 |

OTHER PUBLICATIONS

"Wall Slip in Viscous Fluids and Influence of Materials of Construction", by A. V. Ramamurthy The Society of Rheology, Inc. 337-357, (1986).

"Determination of Branching Distribution in Polyethylene and Ethylene Copolymers", by L. al., Journal of Polymer Science: Polymer Physics Edition, vol. 20, 441-455 (1982).

"Crosslinking Composition Based on High Density Polyethylene and Vinyltris (beta-ethoxyethoxy)silane", XP002387517 Abstract, by Katova, S.A.; Osipchik, V.S., Lebedeva, E.D., Vasilets, L.G., Chemical Abstracts, vol. 133, No. 164751, Sep. 1, 2000, Columbus, Ohio, U.S., Abstract No. 2000:607472.

* cited by examiner

*Primary Examiner* — Ling Choi
*Assistant Examiner* — Chun-Cheng Wang
(74) *Attorney, Agent, or Firm* — Dominick G. Vicari; Joseph S. Ostroff

(57) ABSTRACT

A process for crosslinking polymers employs a silane crosslinker which, upon hydrolysis, produces a reduced quantity of volatile organic compound.

20 Claims, 4 Drawing Sheets

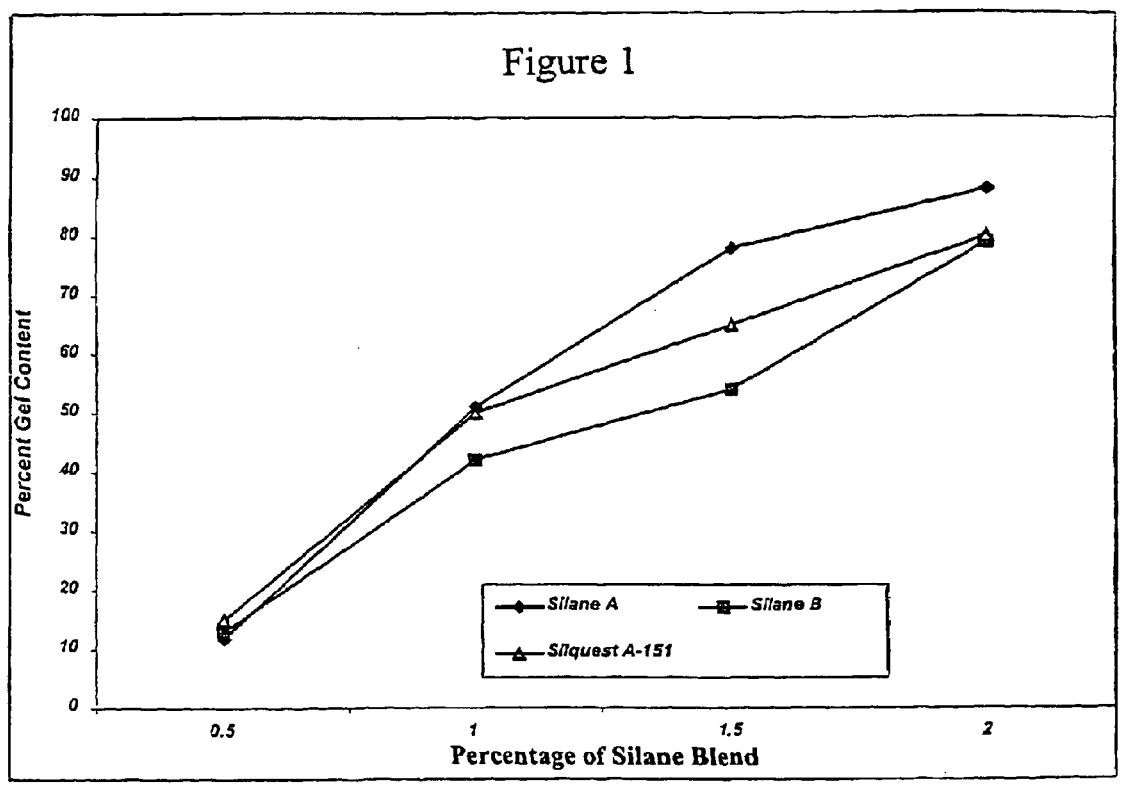

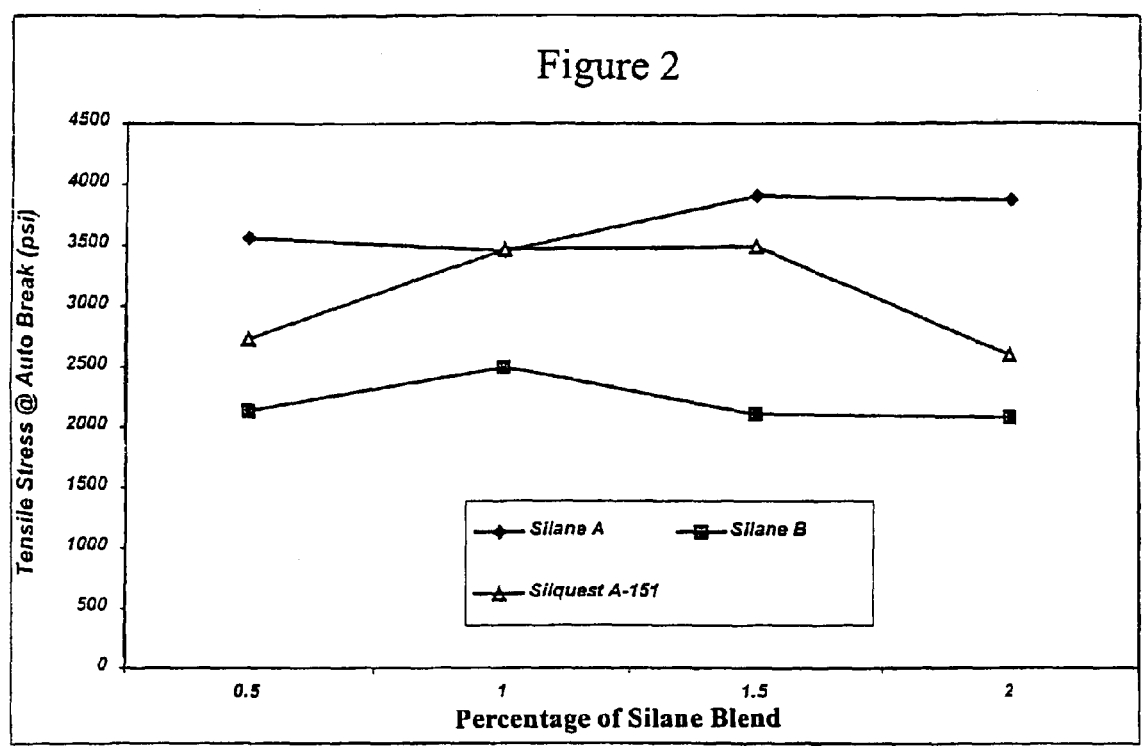

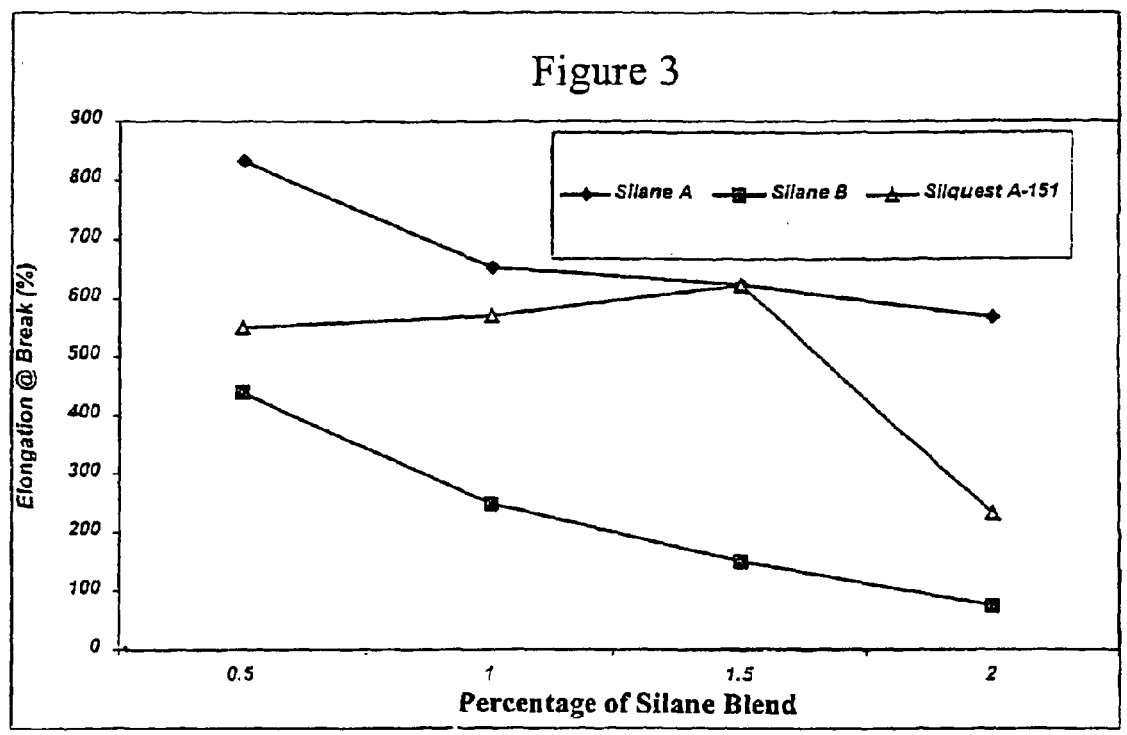

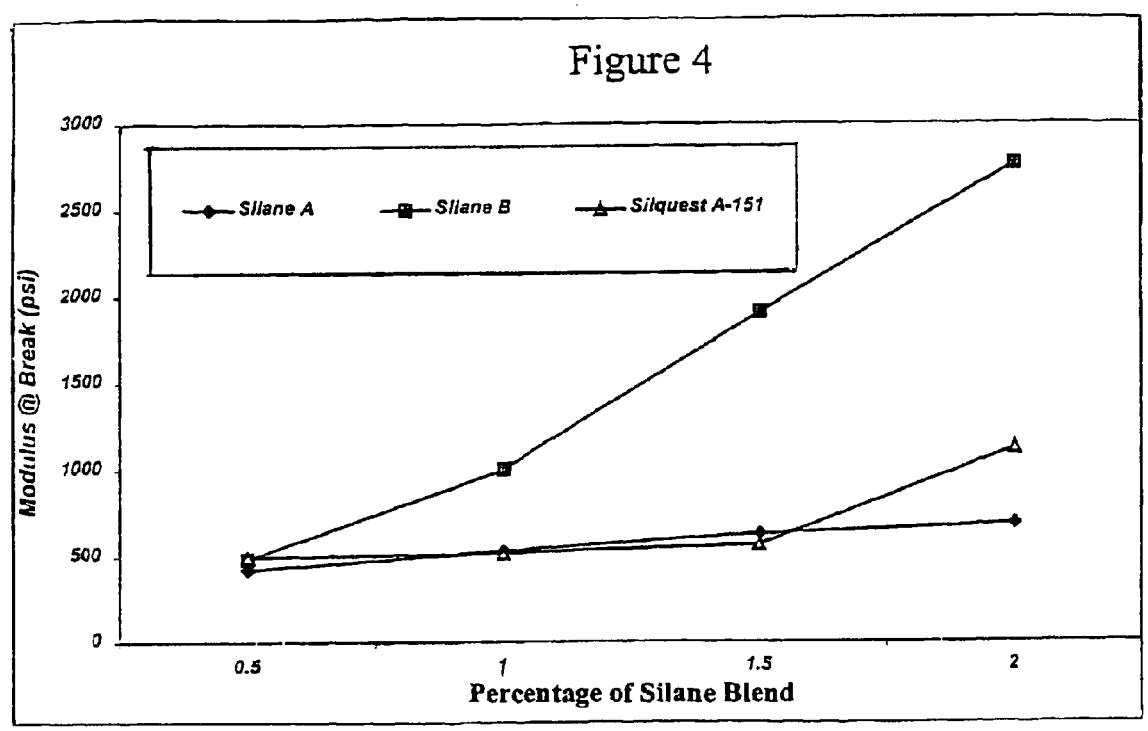

PROCESS FOR THE PRODUCTION OF CROSSLINKED POLYMER EMPLOYING LOW VOC-PRODUCING SILANE CROSSLINKER AND RESULTING CROSSLINKED POLYMER

CROSS-REFERENCE TO RELATED APPLICATION

This application is a continuation of U.S. application Ser. No. 11/975,399, filed on Oct. 19, 2007, now U.S. Pat. No. 7,511,100, which is a continuation of U.S. application Ser. No. 11/280,770 filed on Nov. 16, 2005, now U.S. Pat. No. 7,326,753, which claims priority to U.S. Provisional Application Ser. No. 60/651,112 filed on Feb. 8, 2005, the entire contents of which are incorporated by reference herein.

BACKGROUND OF THE INVENTION

The use of alkoxy-functional silanes for the crosslinking of polymers, especially for the production of pipes, foams, wires and cables, and heat-shrinkable tubing, results in the release of alcohol upon the hydrolysis of the silane. This alcohol is typically methanol or ethanol, and can pose environmental, health, and safety concerns. As the emission of volatile organic compounds (VOCs) becomes more tightly regulated, compounders and pipe, foam, tubing, wire and cable producers are many times forced to reduce production, install recovery or remediation equipment, or use special engineering controls to meet new, stricter emission limits as well as mitigate explosions or flammability hazards. As an example, potable water pipe manufactures are facing increasing limitations on allowable methanol content in as-produced pipes. These producers need a more cost-effective way to reduce the presence and emission of VOCs from their processes that employ conventional silanes.

Silanes are commonly employed as crosslinkers for the production of PEX-b pipe (silane crosslinked polyethylene), wire coatings, insulation jacketing for low- and medium-voltage cables, foams for insulation, and heat shrinkable products such as tubing. The silane is typically used in conjunction with a peroxide, which is used to effect grafting of the silane onto the polymer it will be crosslinking. Other additives, such as anti-oxidants, metal de-activators, condensation catalysts and so forth can also be included.

The most commonly employed silanes are vinyl-functional silanes with vinyltrimethoxy silane being the most prevalent. The production of crosslinked polymers involves grafting the silane onto the polymer and hydrolysis and condensation of the silane to provide crosslinked polymers. The grafting reaction is typically performed in a single screw extruder, while the hydrolysis/condensation reaction can be done under a variety of conditions, including exposure to moisture under ambient conditions, exposure to hot water via submersion of the grafted resin, or exposure to steam. In the production of potable water pipes, for example, hot water is circulated through the extruded pipe to complete the crosslinking. The circulation of hot water for an extended period also helps to remove the by-product methanol that is generated during the crosslinking. It is necessary to circulate water through the pipes until the methanol levels have decreased below allowable limits.

Silane crosslinking of polymers can lead to many improvements in chemical resistance, abrasion resistance, high temperature deformation resistance, wet and dry electrical properties, scratch resistance, tensile strength, flexural strength, creep, stress rupture properties, memory effect, impact strength, resistance to ageing, reduced drip phenomena, and other mechanical properties.

BRIEF DESCRIPTION OF THE INVENTION

In accordance with the present invention, a process is provided for crosslinking a polymer which comprises:

a) introducing into the structure of thermoplastic polymer to be crosslinked under substantially anhydrous conditions a silane which, upon hydrolysis of its hydrolyzable sites, produces a reduced amount of volatile organic compound compared to that produced by the hydrolysis of a silane possessing an equivalent number, per mole, of hydrolyzable sites all of which are hydrolyzable alkoxy groups; and, b) crosslinking the polymer by exposure of the polymer to hydrolysis/condensation conditions, optionally, in the presence of a hydrolysis/condensation catalyst.

The subject invention also includes the crosslinked polymer resulting from the aforesaid crosslinking process and products fabricated therefrom.

The silane employed in the process of this invention achieves crosslinking in a similar fashion to the silane previously utilized for the crosslinking of polymers but has the advantage of producing no significant amount of VOCs with consequent benefits for health and safety concerns of the work environment. Further, the silane used in the present invention reduces the need for recovery and remediation equipment and use of special engineering controls to meet new, stricter emission limits as well as mitigate explosion, flammability, and health hazards. Accordingly, use of the silane in the process of the present invention results in significant economic benefits as well as compared to known polymer crosslinking processes which utilize VOC producing silane.

The expression "volatile organic compound" (VOC) as used herein shall be understood to apply to and designate substantially pure organic compounds that are volatile per EPA (Environmental Protection Agency) method 24 for the United States or do not meet specific criteria established for countries within Europe with respect to vapor pressure or boiling point or are cited as VOCs in European Union Directive 2004/42/EC. Specific examples for such VOCs include methanol, ethanol, propanol, isopropanol, acetoxysilanes, etc.

Various other features, aspects and advantages of the present invention, will become more apparent with reference to the following description and appended claims.

BRIEF DESCRIPTION OF THE DRAWINGS

FIG. 1 is a chart illustrating the percent gel content of Examples 23-30 and Comparative Examples 11-14.

FIG. 2 is a chart illustrating the tensile stress at break of Examples 23-30 and Comparative Examples 11-14.

FIG. 3 is a chart illustrating the percentage elongation at break of Example 23-30 and Comparative Examples 11-14.

FIG. 4 is a chart illustrating the modulus at break of Examples 23-30 and Comparative Examples 11-14.

DETAILED DESCRIPTION OF THE INVENTION

A process is provided for crosslinking a polymer which comprises:

a) introducing into the structure of thermoplastic polymer to be crosslinked under substantially anhydrous conditions a silane which, upon hydrolysis of its hydrolyzable sites, produces a reduced amount of volatile organic compound compared to that produced by the hydrolysis of a silane possessing an equivalent number of hydrolyzable sites all of which are hydrolyzable alkoxy groups; and, b) crosslinking the polymer by exposure of the polymer to silane-hydrolysis conditions, optionally, in the presence of a hydrolysis/condensation catalyst.

The thermoplastic polymer to be crosslinked can be that of a vinyl, an olefin, an acrylate, a methylacrylate, etc., monomer or combinations of such monomers.

The terms "lower alkene" and "lower alkyl" are meant to include in a first embodiment a carbon chain having from 2-20 carbon atoms, in a second embodiment, a carbon chain having from 2-10 carbon atoms, in a third embodiment, a carbon chain having from 2-8 carbon atoms.

The polymer to be crosslinked can be a homopolymer such as polyethylene, polypropylene, polybutadiene, low density polyethylene, high density polyethylene, linear low density polyethylene, polyvinyl chloride, polyvinylidene chloride, chlorinated polyethylene, and the like, or a copolymer such as those derived from two or more of ethylene, propylene, butene, pentene, hexene, heptene, octene, nonene, decene, etc.

According to another embodiment, the polymer to be crosslinked is at least one copolymer selected from the group consisting of (i) ethylene copolymerized with one or more other ethylenically unsaturated monomer such as alpha-olefin of 3-10 carbon atoms, ethylenically unsaturated carboxylic acid, ethylenically unsaturated carboxylic acid ester and ethenically unsaturated dicarboxylic acid anhydride, (ii) olefin-based rubber such as ethylene propylene (EP) rubber, ethylene-propylene-diene monomer (EPDM) rubber and styrene butadiene rubber (SBR) and (iii) ionomer resin, e.g., any of those disclosed in U.S. Pat. No. 4,303,573, the entire contents of which are incorporated by reference herein.

Copolymerizable unsaturated carboxylic acids and anhydrides thereof include acrylic acid, methacrylic acid, butenoic acid, maleic acid, maleic anhydride, and the like.

Copolymerizable ethylenically unsaturated carboxylic acid esters include vinyl acetate, vinyl acrylate, methyl acrylate, ethyl acrylate, butyl acrylate, and methyl methacrylate.

Specific copolymers include those of ethylene-propylene, ethylene-butene, ethylene-hexene, ethylene-octene, ethylene-vinylacetate, ethylene-methylacrylate, ethylene-ethylacrylate, ethylene-butylacrylate, ethylene-propylene diene elastomers, styrene-butadiene, etc.

According to another embodiment, the polymers to be crosslinked can be a blend of two or more such polymers. Thus, e.g., a polyethylene can be blended with any polymer compatible therewith such as polypropylene, polybutadiene, polyisoprene, polychloroprene, chlorinated polyethylene, polyvinyl chloride, a styrene/butadiene copolymer, a vinyl acetate/ethylene co-polymer, an acrylonitrile/butadiene copolymer, and a vinyl chloride/vinyl acetate copolymer.

According to another embodiment, the polymer can be a polymer blend including at least one polyolefin elastomer component and at least one crystalline component. The polyolefin elastomer component of the blend can be a copolymer of ethylene and alpha-olefin or a terpolymer of ethylene, an alpha-olefin and a diene. If the former, then preferably the copolymers used comprise between about 35 and about 95 weight percent (wt %) ethylene, and about 5 and about 65 wt % of at least one alpha-olefin comonomer. According to another embodiment, the copolymers comprise 25 to 65 wt % of at least one alpha-olefin comonomer. The comonomer content is measured using infrared spectroscopy according to ASTM D-2238 Method B. Typically, the substantially linear ethylene polymers are copolymers of ethylene and an alpha-olefin of 3 to about 20 carbon atoms (for example, propylene, 1-butene, 1-hexene, 4-methyl-1-pentene, 1-heptene, 1-octene, styrene, etc.), according to another embodiment of 3 to 10 carbon atoms, and according to yet another embodiment a copolymer of ethylene and 1-octene.

The ethylene/alpha-olefin copolymers can be either heterogeneously branched or homogeneously branched. These heterogeneously branched copolymers, i.e. polyethylenes, fall into two broad categories, those prepared with a free radical generator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. According to an embodiment of the present invention, the elastomer component is LDPE having a density of less than about 0.885 g/cc.

Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an alpha-olefin. HDPE is well known, commercially available in various grades, and while it is not useful in this invention as the polyolefin elastomer (because of its relatively high density), it is useful as the crystalline polyolefin component of the polymer blend.

Linear copolymers of ethylene and at least one alpha-olefin of 3 to 12 carbon atoms, preferably of 4 to 8 carbon atoms, are also well known, commercially available and useful in this invention. As is well known in the art, the density of a linear ethylene/alpha-olefin copolymer is a function of both the length of the alpha-olefin and the amount of such monomer in the copolymer relative to the amount of ethylene, the greater the length of the alpha-olefin and the greater the amount of alpha-olefin present, the lower the density of the copolymer. Linear low density polyethylene (LLDPE) is typically a copolymer of ethylene and an alpha-olefin of 3 to 12 carbon atoms, or 4 to 8 carbon atoms (e.g., 1-butene, 1-hexene, 1-octene, etc.), that has sufficient alpha-olefin content to reduce the density of the copolymer to that of LDPE. When the copolymer contains even more alpha-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

The homogeneously branched polyethylenes that can be used in the practice of this invention also fall into two broad categories, the linear homogeneously branched and the substantially linear homogeneously branched. Both are known. The former and their method of preparation are described in U.S. Pat. No. 3,645,992 to Elston, and the latter and their method of preparation are fully described in U.S. Pat. Nos. 5,272,236, 5,278,272 and 5,380,810, all of which are incorporated herein by reference. Examples of the former are the Tafmer® polymer of Mitsui and the Exact® polymer of Exxon, while an example of the latter are the polymers made by the Insite® Process and Catalyst Technology of The Dow Chemical Company.

As here used, "substantially linear" means that the bulk polymer is substituted, on average, with about 0.01 long-chain branches/1000 total carbons (including both backbone and branch carbons) to about 3 long-chain branches/1000 total carbons, preferably from about 0.01 long-chain branches/1000 total carbons to about 1 long-chain branch/1000 total carbons, more preferably from about 0.05 long-chain branches/1000 total carbons to about 1 long-chain branch/1000 total carbons, and especially from about 0.3 long chain branches/1000 total carbons to about 1 long chain branches/1000 total carbons.

"Long-chain branches" or "long-chain branching" (LCB) means a chain length of at least one (1) carbon less than the number of carbons in the comonomer, as opposed to "short chain branches" or "short chain branching" (SCB) which means a chain length two (2) less than the number of carbons in the comonomer. For example, an ethylene/1-octene substantially linear polymer has backbones with long chain branches of at least seven (7) carbons in length, but it also has short chain branches of only six (6) carbons in length, whereas an ethylene/1-hexene substantially linear polymer has long chain branches of at least five (5) carbons in length but short chain branches of only four (4) carbons in length. LCB can be distinguished from SCB by using $^{13}C$ nuclear magnetic resonance (NMR) spectroscopy and to a limited extent, e.g. for ethylene homopolymers, it can be quantified using the method of Randall (Rev. Macromol. Chem. Phys., C29 (2&3), p. 285-297). However as a practical matter, current $^{13}C$ NMR spectroscopy cannot determine the length of a long-chain branch in excess of about six (6) carbon atoms and as such, this analytical technique cannot distinguish between a seven (7) and a seventy (70) carbon branch. The LCB can be about as long as about the same length as the length of the polymer backbone.

U.S. Pat. No. 4,500,648 teaches that LCB frequency can be represented by the equation $LCB=b/M_w$ in which b is the weight average number of LCB per molecule and $M_w$ is the weight average molecular weight. The molecular weight averages and the LCB characteristics are determined by gel permeation chromatography (GPC) and intrinsic viscosity methods.

One measure of the SCB of an ethylene copolymer is its SCBDI (Short Chain Branch Distribution Index), also known as CDBI (Composition Distribution Branch Index), which is defined as the weight percent of the polymer molecules having a comonomer content within 50 percent of the median total molar comonomer content. The SCBDI or CDBI of a polymer is readily calculated from data obtained from techniques know in the art, such as temperature rising elution fractionation (TREF) as described, for example, in Wild et al., Journal of Polymer Science, Poly. Phys. Ed., Vol. 20, p. 441 (1982), or as described in U.S. Pat. No. 4,798,081 which is incorporated herein by reference. The SCBDI or CDBI for the substantially linear ethylene polymers useful in the present invention is typically greater than about 30 percent, according to another greater than about 50 percent, according to yet another embodiment greater than about 80 percent, and according to still another embodiment greater than about 90 percent.

"Polymer backbone" or just "backbone" means a discrete molecule, and "bulk polymer" or just "polymer" means the product that results from a polymerization process and for substantially linear polymers, that product can include both polymer backbones having LCB and polymer backbones without LCB. Thus a "bulk polymer" includes all backbones formed during polymerization. For substantially linear polymers, not all backbones have LCB but a sufficient number do such that the average LCB content of the bulk polymer positively affects the melt rheology (i.e. the melt fracture properties).

These unique polymers, known as "substantially linear ethylene polymers", are prepared by using constrained geometry catalysts and are characterized by a narrow molecular weight distribution and if an interpolymer, by a narrow comonomer distribution. As here used, "interpolymer" means a polymer of two or more comonomers, for example, a copolymer, terpolymer, etc., or in other words, a polymer made by polymerizing ethylene with at least one other comonomer. Other basic characteristics of these substantially linear ethylene polymers include a low residuals content (that is, low concentrations in the substantially linear ethylene polymer of the catalyst used to prepare the polymer, unreacted comonomers, and low molecular weight oligomers made during the course of the polymerization), and a controlled molecular architecture which provides good processability even though the molecular weight distribution is narrow relative to conventional olefin polymers.

The melt flow ratio, measured as $I_{10}/I_2$ (ASTM D-1238 condition 190/10 for $I_{10}$ and condition 190/2.16 for $I_2$), of these substantially linear ethylene polymers is greater than or equal to 5.63, and is preferably from 6.5 to 15, more preferably from 7 to 10. The molecular weight distribution ($M_w/M_n$), measured by gel permeation chromatography (GPC), is defined by the equation: $M_w/M_n$ is less than or equal to $(I_{10}/I_2)-4.63$, and is between about 1.5 and about 2.5. For substantially linear ethylene polymers, the $I_{10}/I_2$ ratio indicates the degree of long-chain branching, that is, the larger the $I_{10}/I_2$ ratio, the more long-chain branching in the polymer.

The unique characteristic of these homogeneously branched, substantially linear ethylene polymers is a highly unexpected flow property in which the $I_{10}/I_2$ value of the polymer is essentially independent of the polydispersity index (that is, $M_w/M_n$) of the polymer. This is contrasted with conventional linear homogeneously branched polyethylene resins (for example, those described by Elston in U.S. Pat. No. 3,645,992) and conventional linear heterogeneously branched polyethylene resins (for example, those prepared with a free radical generator, such as low density polyethylene, or those prepared with a coordination catalyst, such as linear low density polyethylene) having rheological properties such that to increase the $I_{10}/I_{12}$ value, then the polydispersity index must also be increased.

Substantially linear olefin polymers have a critical shear rate at onset of surface melt fracture of at least 50 percent greater than the critical shear rate at the onset of surface melt fracture of a linear olefin polymer having about the same $I_2$, $M_w/M_n$ and density. "About the same" means that the values are within about ten (10) percent of one another.

The preferred melt flow index, or simply melt index, measured as $I_2$ (ASTM D-1238, condition 190/2.16 (formerly condition E)), is from 0.05 g/10 min to 200 g/10 min, more preferably 0.5 to 20 g/10 min. For example in the case of EPDM, a melt index range from 0.05 to 200 g/10 min corresponds approximately to a Mooney viscosity (ML (1+4), 121° C.) of <1 to 70. According to another embodiment of the present invention, the substantially linear ethylene polymers used are homogeneously branched and do not have any measurable high density fraction, that is, short-chain branching distribution as measured by Temperature Rising Elution Fractionation (which is described in U.S. Pat. No. 5,089,321) or stated in another manner, these polymers do not contain any polymer fraction that has a degree of branching less than or equal to 2 methyls/1000 carbons. These substantially linear ethylene polymers also have a single differential scanning calorimetry (DSC) melting peak between −30° C. and 150° C. at a scan rate of 10° C./min using a second heat.

An apparent shear stress vs. apparent shear rate plot is used to identify the melt fracture phenomena. According to Ramamurthy in Journal of Rheology, 30(2), 337-357 (1986), above a certain critical flow rate, the observed extrudate irregularities can be broadly classified into two main types: surface melt fracture and gross melt fracture.

Surface melt fracture occurs under apparently steady flow conditions and ranges in detail from loss of specular gloss to the more severe form of "sharkskin". In this invention, the onset of surface melt fracture is characterized at the beginning of losing extrudate gloss at which the surface roughness of extrudate can only be detected by 40 times or greater magnification. The critical shear rate at onset of surface melt fracture for the substantially linear ethylene polymers of this invention is at least 50 percent greater than the critical shear rate at the onset of surface melt fracture of a linear ethylene polymer having the about the same $I_2$, $M_w/M_n$ and density. Gross melt fracture occurs at unsteady flow conditions and ranges in detail from regular (alternating rough and smooth, helical, etc.) to random distortions.

The polyolefin elastomer component of the blends that can be used include terpolymers, e.g. ethylene/propylene/diene monomer (EPDM), tetrapolymers, and the like. The diene monomer component of these elastomers include both conjugated and nonconjugated dienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo[2.2.1]hept-2,5-diene, dicyclopentadiene, methyltetrahydroindene, 5-allylbicyclo[2.2.1]hept-2-ene, 1,5-cyclooctadiene, and the like; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene, and the like. According to another embodiment, nonconjugated diene is 5-ethylidene-2-norbornene.

Examples of conjugated dienes include butadiene, isoprene, 2,3-dimethylbutadiene-1,3,1,2-dimethylbutadiene-1,3,1,4-dimethylbutadiene-1,3,1-ethylbutadiene-1,3,2-phenylbutadiene-1,3, hexadiene-1,3,4-methylpentadiene-1,3,1,3-pentadiene ($CH_3CH=CH-CH=CH_2$; commonly called piperylene), 3-methyl-1,3-pentadiene, 2,4-dimethyl-1,3-pentadiene, 3-ethyl-1,3-pentadiene, and the like. According to another embodiment, the conjugated diene is a 1,3-pentadiene.

Exemplary terpolymers include ethylene/propylene/5-ethylidene-2-norbornene, ethylene/1-octene/5-ethylidene-2-norbornene, ethylene/propylene/1,3-pentadiene, and ethylene/1-octene/1,3-pentadiene. Exemplary tetrapolymers include ethylene/propylene/mixed dienes, e.g. ethylene/propylene/5-ethylidene-2-norbornene/piperylene.

The crystalline polyolefin polymer component of the blend has a percent crystallinity of at least about 40%, preferably at least about 50% and more preferably at least about 60%, preferably in combination with a melting point of greater than about 100° C., more preferably greater than about 120° C. The percent crystallinity is determined by dividing the heat of fusion as determined by DSC of a polymer sample by the total heat of fusion for that polymer sample. Preferred crystalline polyolefins include high density polyethylene (as described above), and polypropylene. The total heat of fusion for high density homopolymer (i.e. 100% crystalline) polyethylene is 292 joule/gram (J/g), and the total heat of fusion for 100% crystalline polypropylene is 209 J/g.

If the crystalline polyolefin component of the blend of this invention is polypropylene, then it can be either a homopolymer or one or more copolymers of propylene and up to 20 mole percent ethylene or at least one alpha-olefin having up to about 12 carbon atoms. If a copolymer, then it can be random, block or graft, and it can be either isotactic or syndiotactic. The polypropylene component of this invention has a typical melt flow rate (as determined by ASTM D-1238, Procedure A Conditions E (for $I_2$) and N (for $I_{10}$), at a temperature of 230° C.) of between about 0.1 and about 100 g/10 min, and preferably between about 0.8 and about 30 g/10 min.

The blend composition can vary widely, but typically the polyolefin elastomer:crystalline polymer weight ratio is at least about 70:30. According to another embodiment, the polyolefin elastomer:crystalline polymer weight ratio is at least about 80:20. According to yet another embodiment, the polyolefin elastomer:crystalline polymer weight ratio is at least about 85:15. The polyolefin elastomer:crystalline polymer weight ratio typically does not exceed about 99:1.

Silanes suitable for the present invention include silanes of the general formula

$$[Y[-G(-SiX_uZ^b_vZ^c_w)_s]_r]_n \quad \text{(Formula 1)}$$

wherein each occurrence of G is independently chosen from a set of groups comprising a polyvalent group derived by substitution of one or more hydrogen atoms of an alkyl, alkenyl, aryl or aralkyl group, or a molecular component which can be obtained by removal of one or more hydrogen atoms of a heterocarbon, with G containing from about 1 to about 30 carbon atoms; each occurrence of X is independently selected from the group consisting of —Cl, —Br, $R^1O$—, $R^1C(=O)O$—, $R^1R^2C=NO$—, $R^1R^2NO$— or $R^1R^2N$—, —$R^1$, —$(OSiR^1R^2)_t(OSi\ R^1R^2R^3)$, and —$O(R^{10}CR^{11})_fOH$, wherein each occurrence of $R^1$, $R^2$, $R^3$, $R^{10}$, and $R^{11}$ is independently R; each occurrence of $Z^b$ is independently (—O—)$_{0.5}$, and [—$O(R^{10}CR^{11})_fO$-]$_{0.5}$, wherein each occurrence of $R^{10}$ and $R^{11}$ is independently R; each occurrence of $Z^c$ is independently given by —$O(R^{10}CR^{11})_fO$— wherein each occurrence of $R^{10}$ and $R^{11}$ is independently R; each occurrence of R is chosen independently from the set of groups comprising hydrogen; straight, cyclic or branched alkyl groups and can contain unsaturated, alkenyl groups, aryl groups, and aralkyl groups; or molecular components obtained by removal of one or more hydrogen atoms of a heterocarbon; each occurrence of R containing 1 to about 20 carbon atoms; each occurrence of the subscript f is an integer from 1 to about 15, each occurrence of n is an integer from 1 to about 100, with the proviso that when n is greater than 1, v is a greater than 0 and all the valences for $Z^b$ have a silicon atom bonded to them, each occurrence of the subscript u is an integer from 0 to about 3, each occurrence of the subscript v is an integer from 0 to about 3, each occurrence of the subscript w is an integer from 0 to about 1, with the proviso that u+v+2w=3, each occurrence of the subscript r is an integer from 1 to about 6, each occurrence of the subscript t is an integer from 0 to about 50, and each occurrence of the subscript s is an integer from 1 to about 6; and each occurrence of Y is an organofunctional group of valence r; and at least one cyclic and bridging dialkoxy organofunctional silane comprising the cyclic and bridging dialkoxy organofunctional silane composition containing at least one occurrence of $Z^b$ or $Z^c$.

Group Y herein includes univalent organofunctional groups (r=1), divalent organofunctional groups (r=2), trivalent organofunctional groups (r=3), tetravalent organofunctional groups (r=4), as well as organofunctional groups of higher valency, herein referred to as polyvalent organofunctional groups. The term polyvalent organofunctional group herein shall be understood to include univalent, divalent, trivalent, and tetravalent organofunctional groups. According to another embodiment of the present invention, Y in general formula 1 described above is $CH_2=CH-$, $CHR=CH-$, or $CR_2=CH-$. The present invention will be described more specifically by referring to the exemplary embodiments thereof. However, it should be noted that the present invention is not limited only to the following exemplary embodiments.

Another embodiment of the present invention herein includes univalent organofunctional groups such as mercapto and acyloxy groups such as acryloxy, methacryloxy and acetoxy. Another embodiment of the present invention herein includes univalent epoxys such as glycidoxy, $-O-CH_2-C_2H_3O$; epoxycyclohexylethyl, $-CH_2-CH_2-C_6H_9O$; epoxycyclohexyl, $-C_6H_9O$; epoxy, $-CR^6(-O-)CR^4R^5$. Another embodiment of the present invention herein includes univalent organofunctional groups such as hydroxy, carbamate, $-NR^4C(=O)OR^5$; urethane, $-OC(=O)NR^4R^5$; thiocarbamate, $-NR^4C(=O)SR^5$; thiourethane, $-SC(=O)NR^4R^5$; thionocarbamate, $-NR^4C(=S)OR^5$; thionourethane, $-OC(=S)NR^4R^5$; dithiocarbamate, $-NR^4C(=S)SR^5$; and dithiourethane, $-SC(=S)NR^4R^5$. Another embodiment of the present invention herein includes univalent organofunctional groups such as maleimide; maleate and substituted maleate; fumarate and substituted fumarate; nitrile, CN; citraconimide. Another embodiment of the present invention herein includes univalent organofunctional groups such as cyanate, $-OCN$; isocyanate, $-N=C=O$; thiocyanate, $-SCN$; isothiocyanate, $-N=C=S$; and ether, $-OR^4$. Another embodiment of the present invention herein includes univalent organofunctional groups such as fluoro, $-F$; chloro, $-Cl$; bromo, $-Br$; iodo, $-I$; and thioether, $-SR^4$. Another embodiment of the present invention herein includes univalent organofunctional groups such as disulfide, $-S-SR^4$; trisulfide, $-S-S-SR^4$; tetrasulfide, $-S-S-S-SR^4$; pentasulfide, $-S-S-S-S-SR^4$; hexasulfide, $-S-S-S-S-S-SR^4$; and polysulfide, $-S_xR^4$. Another embodiment of the present invention herein includes univalent organofunctional groups such as xanthate, $-SC(=S)OR^4$; trithiocarbonate, $-SC(=S)SR^4$; dithiocarbonate, $-SC(=O)SR^4$; ureido, $-NR^4C(=O)NR^5R^6$; thionoureido (also better known as thioureido), $-NR^4C(=S)NR^5R^6$; amide, $R^4C(=O)NR^5-$ and $-C(=O)NR^4R^5-$; thionoamide (also better known as thioamide), $R^4C(=S)NR^4-$; univalent melamino; and, univalent cyanurato. Another embodiment of the present invention herein includes univalent organofunctional groups such as primary amino, $-NH_2$; secondary amino, $-NHR^4$; and tertiary amino, $-NR^4R^5$; univalent diamino, $-NR^4-L^1-NR^5R^6$; univalent triamino, $-NR^4-L^1(-NR^5R^6)_2$ and $-NR^4-L^1-NR^5-L^2-NR^6R^7$; and univalent tetramino, $-NR^4-L^1(-NR^5R^6)_3$, $-NR^4-L^1-NR^5-L^2-NR^6-L^3-NR^7R^8$, and $-NR^4-L^1-N(-L^2NR^5R^6)_2$; wherein each occurrence of $L^1$, $L^2$, and $L^3$ is selected independently from the set of structures given above for G; each occurrence of $R^4$, $R^5$, $R^6$, $R^7$ and $R^8$ is independently given by one of the structures listed above for R; and each occurrence of the subscript, x, is independently given by x is 1 to 10.

Another embodiment of the present invention herein includes divalent organofunctional groups such as epoxy, $-(-)C(-O-)CR^4R^5$ and $-CR^5(-O-)CR^4-$. Another embodiment of the present invention herein includes divalent organofunctional groups such as carbamate, $-(-)$ $NC(=O)$ $OR^5$; urethane, $-OC(=O)NR^4-$; thiocarbamate, $-(-)$ $NC(=O)SR^5$; thiourethane, $-SC(=O)NR^4-$; thionocarbamate, $-(-)NC(=S)OR^5$; thionourethane, $-OC(=S)NR^4-$; dithiocarbamate, $-(-)$ $NC(=S)SR^5$; dithiourethane, $-SC(=S)NR^4-$; and ether, $-O-$. Another embodiment of the present invention herein includes divalent organofunctional groups such as maleate and substituted maleate; fumarate and substituted fumarate. Another embodiment of the present invention herein includes thioether, $-S-$; disulfide, $-S-S-$; trisulfide, $-S-S-S-$; tetrasulfide, $-S-S-S-S-$; pentasulfide, $-S-S-S-S-S-$; hexasulfide, $-S-S-S-S-S-S-$; and polysulfide, $-S_x-$. Another embodiment of the present invention herein includes divalent organofunctional groups such as xanthate, $-SC(=S)O-$; trithiocarbonate, $-SC(=S)S-$; dithiocarbonate, $-SC(=O)S-$; ureido, $-(-)$ $NC(=O)NR^4R^5$ and $-NR^4C(=O)NR^5-$; thionoureido, also better known as thioureido, $-(-)$ $NC(=S)NR^4R^5$ and $-NR^4C(=S)NR^5-$; amide, $R^4C(=O)N(-)-$ and $-C(=O)NR^4-$; thionoamide, also better known as thioamide, $R^4C(=S)N(-)-$; divalent melamino; divalent cyanurato. Another embodiment of the present invention herein includes divalent organofunctional groups such as secondary amino, $-NH-$; tertiary amino, $-NR^4-$; divalent diamino, $-(-)N-L^1-NR^4R^5$ and $-NR^4-L^1-NR^5-$; divalent triamino, $-(-)NR^4)_2-L^1-NR^5R^6$, $-(-)N-L^1-NR^5-L^3-NR^6R^7$, $-NR^4-L^1-N(-)-L^2-NR^5R^6$, and $-NR^4-L^1-NR^5-L^2-NR^6-$; and divalent tetramino, $-(-)N-L^1-(NR^5R^6)_3$, $(-NR^4)_2-L^1-(NR^5R^6)_2$, $-(-)$ $N-L^1-NR^4-L^2-NR^5-L^3-NR^6R^7$, $-NR^4-L^1-N(-)-L^2-NR^5-L^3NR^6R^7$, $-NR^4-L^1-NR^5-L^2-N(-)-L^3-NR^6R^7$, $-NR^4-L^1-NR^5-L^2-NR^6-L^3-NR^7-$, $-(-)N-L^1-N(-L^2NR^5R^6)_2$, and $(-NR^4L^1-)_2N-L^2NR^5R^6$; wherein each occurrence of $L^1$, $L^2$, and $L^3$ is selected independently from the set of structures given above for G; each occurrence of $R^4$, $R^5$, $R^6$, and $R^7$ is independently given by one of the structures listed above for R; and each occurrence of the subscript, x, is independently given by x is 1 to 10.

Another embodiment of the present invention herein includes trivalent organofunctional groups such as epoxy, $-(-)C(-O-)CR^4-$. Another embodiment of the present invention herein includes trivalent organofunctional groups such as carbamate, $-(-)$ $NC(=O)O-$; thiocarbamate, $-(-)$ $NC(=O)S-$; thionocarbamate, $-(-)NC(=S)O-$; and dithiocarbamate, $-(-)NC(=S)S-$. ureido, $-(-)NC(=O)NR^4-$; thionoureido, also better known as thioureido, $-(-)NC(=S)NR^4-$; amide, $-C(=O)N(-)-$; thionoamide, also better known as thioamide, $-C(=S)N(-)-$; trivalent melamino; and trivalent cyanurato. Another embodiment of the present invention herein includes trivalent organofunctional groups such as tertiary amino, $-N(-)-$; trivalent diamino, $-(-)N-L^1-NR^4-$; trivalent triamino, $(-NR^4)_3-L^1$, $(-NR^4)_2-L^1-NR^5-$, $-(-)N-L^1-N(-)-L^2-NR^3R^4$, $-NR^4-L^1-N(-)-L^2-NR^5-$, and $-(-)N-L^1-NR^4-L^2-NR^5-$; and trivalent tetramino, $-(-)N-L^1-N(-)-L^2-NR^5-L^3-NR^3R^4$, $-NR^4-L^1-N(-)-L^2-N(-)-L^3-NR^3R^4$, $-(-)N-L^1-NR^5-L^2-N(-)-L^3-NR^3R^4$, $-NR^4-L^1-N(-)-L^2-NR^3-L^3-NR^4-$, $-(-)N-L^1-N(-L^2NR^3R^4)(-L^2NR^5-)$, and $(-NR^4L^1-)_3N$; wherein each occurrence of $L^1$, $L^2$, and $L^3$ is selected independently from the set of structures given above for G; and each occurrence of $R^4$, $R^5$, and $R^6$ is independently given by one of the structures listed above for R.

Another embodiment of the present invention herein includes tetravalent organofunctional group such as epoxy, $-(-)C(-O-)C(-)-$. Another embodiment of the present invention herein includes tetravalent organofunctional groups such as ureido, $-(-)NC(=O)N(-)-$; thionoureido (also better known as thioureido), $-(-)NC(=S)N(-)-$; and tetravalent melamino. Another embodiment of the present invention herein includes tetravalent organofunctional groups tetravalent diamino, —(-)N-L¹-N(-)—; tetravalent triamino, (—NR⁴)₄-L¹, (—NR⁴)₂-L¹-N(-)—, —(-)N-L¹-N(-)-L²-NR³—, and —(-)N-L¹-NR⁴-L²(-)—; and tetravalent tetramino, —(-)N-L¹-N(-)-L²-N (-)-L³-NR⁴R³, —NR⁴-L¹-N(-)-L²-N(-)-L³-NR³—, —(-)N-L'-NR⁴-L²-NR³-L³-N(-)—, and —(-)N-L¹-N (-L²NR³—)₂; wherein each occurrence of L¹, L², and L³ is selected independently from the set of structures given above for G; and each occurrence of R⁴ and R⁵ is independently given by one of the structures listed above for R.

Another embodiment of the present invention herein includes polyvalent organofunctional groups such as, but is not limited to, polyvalent hydrocarbon groups; pentavalent melamino, (—NR³)(—N—)₂C₃N₃; hexavalent melamino, (—N—)₃C₃N₃; pentavalent triamino, —(-)N-L'-N(-)-L²-N (-)—; pentavalent tetramino, —(-)N-L'-N(-)-L²-N(-)-L³-NR³—, —(-)N-L'-NR³-L²-N(-)-L³-N(-)—, and [—(-)N-L¹-]₂N-L²NR³—; and hexavalent tetramino, —(-)N-L¹-N (-)-L²-N(-)-L³-N(-)- and [—(-)N-L¹-]₃N; wherein each occurrence of L¹, L², and L³ is selected independently from the set of structures given above for G; and each occurrence of R⁴ is independently given by one of the structures listed above for R.

As used herein, diol, hydrocarbon diol, and difunctional alcohol refer to any structure given by Formula 2:

HO(R¹⁰CR¹¹)$_f$OH    (Formula 2)

wherein f, R¹⁰, and R¹¹ are as defined above. These structures represent hydrocarbons or heterocarbons in which two hydrogen atoms are replaced with OH in accordance with the structures drawn in Formula 2. As used herein, dialkoxy and difunctional alkoxy refer to any hydrocarbon diol, as defined herein, in which the hydrogen atoms of the two OH groups have been removed to a give divalent radical, and whose structure is given by Formula 3:

—O(R¹⁰CR¹¹)$_f$O—    (Formula 3)

wherein f, R¹⁰, and R¹¹ are as defined above. As used herein, cyclic dialkoxy refers to a silane or group in which cyclization is about silicon, by two oxygen atoms each attached to a common divalent hydrocarbon or heterocarbon group, such as is commonly found in diols. Cyclic dialkoxy groups herein are represented by $Z^c$. As used herein, bridging dialkoxy refers to a silane or group in which two different silicon atoms are each bound to one oxygen atom, which is in turn bound to a common divalent hydrocarbon or heterocarbon group as defined herein, such as is commonly found in diols. Bridging dialkoxy groups herein are represented by $Z^b$. As used herein, cyclic and bridging refers to a silane or group encompassing cyclic only, without bridging; bridging only, without cyclic; and any combination of both cyclic and bridging. Thus, a cyclic and bridging silane could mean, for example, a silane with a silicon atom bound to a cyclic dialkoxy group, a silane with a silicon atom not bound to a cyclic dialkoxy group and bound to bridging dialkoxy group(s) only, a silane with silicon bound to both one end of a bridging dialkoxy group and both ends of a cyclic dialkoxy group, a silane with a silicon atom not bound at all to a dialkoxy group (as long as at least one other silicon atom in the same molecule is bound to at least one cyclic or bridging dialkoxy group), etc. As used herein, hydrocarbon based diols refer to diols, which contain two OH groups on a hydrocarbon or heterocarbon structure. The term, "hydrocarbon based diol", refers to the fact that the backbone between the two oxygen atoms consists entirely of carbon atoms, carbon-carbon bonds between the carbon atoms, and two carbon-oxygen bonds encompassing the alkoxy ends. The heterocarbons in the structure occur pendent to the carbon backbone.

The structures given by Formula 2 will herein be referred to as the appropriate diol, in a few specific cases, glycol is the more commonly used term, prefixed by the particular hydrocarbon or heterocarbon group associated with the two OH groups. Examples include neopentylglycol, 1,3-butanediol, and 2-methyl-2,4-pentanediol. The groups whose structures are given by Formula 3 will herein be referred to as the appropriate dialkoxy, prefixed by the particular hydrocarbon or heterocarbon group associated with the two OH groups. Thus, for example, the diols, neopentylglycol, 1,3-butanediol, and 2-methyl-2,4-pentanediol correspond herein to the dialkoxy groups, neopentylglycoxy, 1,3-butanedialkoxy, and 2-methyl-2,4-pentanedialkoxy, respectively.

The cyclic and bridging dialkoxy organofunctional silanes used herein, in which the silane is derived from a diol, commonly referred to as a glycol, are correspondingly glycoxysilane. Also, the cyclic and bridging organofunctional dialkoxy silanes used herein, in which the silane is derived from a diol, commonly referred to as a diol, are correspondingly named dialkoxysilane.

As used herein, the notations, (—O—)$_{0.5}$ and [—O (R¹⁰CR¹¹)$_f$O—]$_{0.5}$, refer to one half of a siloxane group, Si—O—Si, and one half of a bridging dialkoxy group, respectively. These notations are used in conjunction with a silicon atom and they are taken herein to mean one half of an oxygen atom, namely, the half bound to the particular silicon atom, or to one half of a dialkoxy group, namely, the half bound to the particular silicon atom, respectively. It is understood that the other half of the oxygen atom or dialkoxy group and its bond to silicon occurs somewhere else in the overall molecular structure being described. Thus, the (—O—)$_{0.5}$ siloxane groups and the [—O(R¹⁰CR¹¹)$_f$O—]$_{0.5}$ dialkoxy groups mediate the chemical bonds that hold two separate silicon atoms together, whether these two silicon atoms occur intermolecularly or intramolecularly. In the case of [—O (R¹⁰CR¹¹)$_f$O—]$_{0.5}$, if the hydrocarbon group, (R¹⁰CR¹¹)$_f$, is unsymmetrical, either end of [—O(R¹⁰CR¹¹)$_f$O—]$_{0.5}$ can be bound to either of the two silicon atoms required to complete the structures given in Formula 1.

As used herein, alkyl includes straight, branched and cyclic alkyl groups; alkenyl includes any straight, branched, or cyclic alkenyl group containing one or more carbon-carbon double bonds, where the point of substitution can be either at a carbon-carbon double bond or elsewhere in the group. Also, alkynyl includes any straight, branched, or cyclic alkynyl group containing one or more carbon-carbon triple bonds and optionally also one or more carbon-carbon double bonds as well, where the point of substitution can be either at a carbon-carbon triple bond, a carbon-carbon double bond, or elsewhere in the group. Specific examples of alkyls include methyl, ethyl, propyl, isobutyl. Specific examples of alkenyls include vinyl, propenyl, allyl, methallyl, ethylidenyl norbornane, ethylidene norbornyl, ethylidenyl norbornene and ethylidene norbornenyl. Specific examples of alkynyls include acetylenyl, propargyl and methylacetylenyl.

As used herein, aryl includes any aromatic hydrocarbon from which one hydrogen atom has been removed; aralkyl includes any of the aforementioned alkyl groups in which one or more hydrogen atoms have been substituted by the same number of like and/or different aryl (as defined herein) substituents; and arenyl includes any of the aforementioned aryl groups in which one or more hydrogen atoms have been substituted by the same number of like and/or different alkyl (as defined herein) substituents. Specific examples of aryls include phenyl and naphthalenyl. Specific examples of aralkyls include benzyl and phenethyl. Specific examples of arenyls include tolyl and xylyl.

As used herein, cyclic alkyl, cyclic alkenyl and cyclic alkynyl also include bicyclic, tricyclic, and higher cyclic structures, as well as the aforementioned cyclic structures further substituted with alkyl, alkenyl and/or alkynyl groups. Representative examples include norbornyl, norbornenyl, ethylnorbornyl, ethylnorbornenyl, ethylcyclohexyl, ethylcyclohexenyl, cyclohexylcyclohexyl, and cyclododecatrienyl.

As used herein, the term, heterocarbon, refers to any hydrocarbon structure in which the carbon-carbon bonding backbone is interrupted by bonding to atoms of nitrogen and/or oxygen; or in which the carbon-carbon bonding backbone is interrupted by bonding to groups of atoms containing nitrogen and/or oxygen, such as cyanurate ($C_3N_3O_3$). Thus, heterocarbons include, but are not limited to branched, straight-chain, cyclic and/or polycyclic aliphatic hydrocarbons, optionally containing ether functionality via oxygen atoms each of which is bound to two separate carbon atoms, tertiary amine functionality via nitrogen atoms each of which is bound to three separate carbon atoms, melamino groups and/or cyanurate groups; aromatic hydrocarbons; and arenes derived by substitution of the aforementioned aromatics with branched or straight chain alkyl, alkenyl, alkynyl, aryl and/or aralkyl groups.

Representative examples of G include —$(CH_2)_m$— wherein m is 1 to 12; diethylene cyclohexane; 1,2,4-triethylene cyclohexane; diethylene benzene; phenylene; —$(CH_2)_p$— wherein p is 1 to 20, which represent the terminal straight-chain alkyls further substituted terminally at the other end, such as —$CH_2$—, —$CH_2CH_2$—, —$CH_2CH_2CH_2$—, and —$CH_2CH_2CH_2CH_2CH_2CH_2CH_2CH_2$—, and their beta-substituted analogs, such as —$CH_2(CH_2)_qCH(CH_3)$—, where q is zero to 17; —$CH_2CH_2C(CH_3)_2CH_2$—; the structure derivable from methallyl chloride, —$CH_2CH(CH_3)CH_2$—; any of the structures derivable from divinylbenzene, such as —$CH_2CH_2(C_6H_4)CH_2CH_2$— and —$CH_2CH_2(C_6H_4)CH(CH_3)$—, where the notation $C_6H_4$ denotes a disubstituted benzene ring; any of the structures derivable from dipropenylbenzene, such as —$CH_2CH(CH_3)$ $(C_6H_4)CH(CH_3)$ $CH_2$—, where the notation $C_6H_4$ denotes a disubstituted benzene ring; any of the structures derivable from butadiene, such as —$CH_2CH_2CH_2CH_2$—, —$CH_2CH_2CH(CH_3)$—, and —$CH_2CH(CH_2CH_3)$—; any of the structures derivable from piperylene, such as —$CH_2CH_2CH_2CH(CH_3)$—, —$CH_2CH_2CH(CH_2CH_3)$—, and —$CH_2CH(CH_2CH_2CH_3)$—; any of the structures derivable from isoprene, such as —$CH_2CH(CH_3)CH_2CH_2$—, —$CH_2CH(CH_3)CH(CH_3)$—, —$CH_2C(CH_3)(CH_2CH_3)$—, —$CH_2CH_2CH(CH_3)CH_2$—, —$CH_2CH_2C(CH_3)_2$— and —$CH_2CH[CH(CH_3)_2]$—; any of the isomers of —$CH_2CH_2$-norbornyl-, —$CH_2CH_2$-cyclohexyl-; any of the diradicals obtainable from norbornane, cyclohexane, cyclopentane, tetrahydrodicyclopentadiene, or cyclododecene by loss of two hydrogen atoms; the structures derivable from limonene, —$CH_2CH(4$-methyl-1-$C_6H_9$—)$CH_3$, where the notation $C_6H_9$ denotes isomers of the trisubstituted cyclohexane ring lacking substitution in the 2 position; any of the monovinyl-containing structures derivable from trivinylcyclohexane, such as —$CH_2CH_2(vinylC_6H_9)CH_2CH_2$— and —$CH_2CH_2(vinylC_6H_9)CH(CH_3)$—, where the notation $C_6H_9$ denotes any isomer of the trisubstituted cyclohexane ring; any of the monounsaturated structures derivable from myrcene containing a trisubstituted C=C, such as —$CH_2CH[CH_2CH_2CH$=$C(CH_3)_2]CH_2CH_2$—, —$CH_2CH[CH_2CH_2CH$=$C(CH_3)_2]CH(CH_3)$—, —$CH_2C[CH_2CH_2CH$=$C(CH_3)_2](CH_2CH_3)$—, —$CH_2CH_2CH[CH_2CH_2CH$=$C(CH_3)_2]CH_2$—, —$CH_2CH_2CH[CH_2CH_2CH$=$C(CH_3)_2](C$—$)(CH_3)$ $CH_2CH_2CH[CH_2CH_2CH$=$C(CH_3)_2]$, and —$CH_2CH[CH[CH_2CH_2CH$=$C(CH_3)_2]]$—; and any of the monounsaturated structures derivable from myrcene lacking a trisubstituted C=C, such as —$CH_2CH(CH$=$CH_2)$ $CH_2CH_2CH_2C(CH_3)_2$—, —$CH_2CH(CH$=$CH_2)$ $CH_2CH_2CH[CH(CH_3)_2]$—, —$CH_2C(=CH$—$CH_3)$ $CH_2CH_2CH_2C(CH_3)_2$—, —$CH_2C(=CH$—$CH_3)$ $CH_2CH_2CH[CH(CH_3)_2]$—, —$CH_2CH_2C(=CH_2)$ $CH_2CH_2CH_2C(CH_3)_2$—, —$CH_2CH_2C(=CH_2)CH_2CH_2CH[CH(CH_3)_2]$—, —$CH_2CH$=$C(CH_3)_2CH_2CH_2CH_2C(CH_3)_2$—, and —$CH_2CH$=$C(CH_3)_2CH_2CH_2CH[CH(CH_3)_2]$.

Representative examples of R groups are H, branched and straight-chain alkyls of 1 to 20 carbon atoms such as methyl, ethyl, propyl, isopropyl, butyl, octenyl, cyclohexyl, phenyl, benzyl, tolyl, allyl, methoxyethyl, ethoxyethyl dimethylaminoethyl, cyanoethyl and the like. In another embodiment, representative $R^{10}$ and $R^{11}$ groups are hydrogen, methyl, and ethyl, of which hydrogen and methyl are most preferred. In yet another embodiment, representative $R^1$ and $R^2$ groups can be hydrogen, methyl, ethyl or propyl. In still another embodiment, representative examples of $R^3$, $R^4$, $R^5$, $R^6$, $R^7$ and $R^8$ groups can be H, $C_1$ to $C_4$ straight chain or branched alkyls such as methyl, ethyl, propyl, isopropyl, butyl, isobutyl, pentyl, hexyl, heptyl, octyl and aryl such as phenyl, benzyl, etc.

Specific examples of X are methoxy, ethoxy, propoxy, isopropoxy, isobutoxy, acetoxy, methoxyethoxy, and oximato, as well as the monovalent alkoxy groups derived from diols, known as "dangling diols", specifically, groups containing an alcohol and an alkoxy, such as (—O—$CH_2CH$—OH), ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol and pinacol. In another embodiment, specific examples of X are methoxy, acetoxy and ethoxy, as well as the monovalent alkoxy groups derived from the diols, ethylene glycol, propylene glycol, neopentyl glycol, 1,3-propanediol, 2-methyl-1,3-propanediol, 1,3-butanediol and 2-methyl-2,4-pentanediol.

Specific examples of $Z^b$ and $Z^c$ can be the divalent alkoxy groups derived from diols, such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol and pinacol. In another embodiment, specific examples of $Z^b$ and $Z^c$ are the divalent alkoxy groups derived from the diols such as ethylene glycol, propylene glycol, neopentyl glycol, 1,3-propanediol, 2-methyl-1,3-propanediol, 1,3-butanediol and 2-methyl-2,4-pentanediol are preferred. The divalent alkoxy groups derived from the diols, 1,3-propanediol, 2-methyl-1,3-propanediol, 1,3-butanediol, and 2-methyl-2,4-pentanediol. The bridging ($Z^b$) content of the cyclic and bridging organofunctional silane compositions herein must be kept sufficiently low to prevent excessive average molecular weights and crosslinking, which would lead to gelation.

Additional embodiments are wherein v and w in Formulas 1 can be such that the ratio of w/v is between 1 and 9; X is RO— or RC(=O)O—; $Z^b$ and $Z^c$ can be derived from the diols, 1,3-propanediol, 2-methyl-1,3-propanediol, 1,3-butanediol and 2-methyl-2,4-pentanediol; R is an alkyl of $C_1$ to $C_4$ or H; and G is a divalent straight chain alkyl of 2 to 18 carbon atoms. Other embodiments include those wherein w/v is between 2 and 8; X is ethoxy or one or more of the dangling diols derived from the diols, 1,3-propanediol, 2-methyl-1,3- propanediol, 1,3-butanediol and 2-methyl-2,4-pentanediol; and G is a $C_2$-$C_{12}$ straight-chain alkyl derivative. Another embodiment are wherein v in Formula 1 is 0; X is RO— or RC(=O)O—; R is an alkyl of $C_1$ to $C_4$ or H; and G is a divalent straight chain alkyl of 2 to 18 carbon atoms.

Representative examples of the cyclic and bridging dialkoxy organofunctional silanes described in the present invention include 1,3-propanedialkoxyethoxyvinylsilane; 1,3-propanedialkoxymethoxyvinylsilane, 1,3-propanedialkoxyisopropoxyvinylsilane; 2-methyl-2,4-pentanedialkoxymethoxyvinylsilane; 2-methyl-2,4-pentanedialkoxyethoxyvinylsilane; 2-methyl-2,4-pentanedialkoxyispropoxyvinylsilane; 1,3-butanedialkoxymethoxyvinylsilane; 1,3-butanedialkoxyethoxyvinylsilane; 1,3-butanedialkoxyisopropoxyvinylsilane; neopentyldialkoxymethoxyvinylsilane; neopentyldialkoxyethoxyvinylsilane; neopentyldialkoxyisopropoxyvinylsilane; 2,3-dimethyl-2,3-butanedialkoxymethoxyvinylsilane; 2,3-dimethyl-2,3-butanedialkoxyethoxyvinylsilane; 2,3-dimethyl-2,3-butanedialkoxyisopropoxyvinylsilane; 2-methyl-1,3-propanedialkoxymethoxyvinylsilane; 2-methyl-1,3-propanedialkoxyvinylsilane; 2-methyl-1,3-propanedialkoxyisopropoxyvinylsilane; 2-(2-methyl-2,4 pentanedialkoxyethoxysilyl)-1-propyl amine; 2-(2-methyl-2,4-pentanedialkoxyisopropoxysilyl)-1-propyl mercaptan; 2-(2-methyl-2,4-pentanedialkoxymethylsilyl)-1-propyl chloride; 2-(2-methyl-2,4-pentanedialkoxyphenylsilyl)-1-propyl bromide; 3-(1,3-butanedialkoxyethoxysilyl)-1-propyl iodide; 3-(1,3-butanedialkoxyisopropoxysilyl)-1-propyl chloride; N-[3-(1,3-propanedialkoxyethoxysilyl)-1-propyl] phenylamine; N-[3-(1,3-propanedialkoxyisopropoxysilyl)-1-propyl]methylamine; 3-(1,2-propanedialkoxyethoxysilyl)-1-propyl glycidyl ether and 3-(1,2-propanedialkoxyisopropoxysilyl)-1-propyl methacrylate, both derivable from propylene glycol; 3-(1,2-ethanedialkoxyethoxysilyl)-1-propyl acrylate and 3-(1,2-ethanedialkoxyisopropoxysilyl)-1-propyl acetate, both derivable from ethylene glycol; 3-(neopentyl glycoxyethoxysilyl)-1-propyl amine and 3-(neopentyl glycoxyisopropoxysilyl)-1-propyl glycidyl ether, both derivable from neopentyl glycol; 3-(2,3-dimethyl-2,3-butanedialkoxyethoxysilyl)-1-propyl acrylate and 3-(2,3-dimethyl-2,3-butanedialkoxyisopropoxysilyl)-1-propyl methacrylate, both derivable from pinacol; 3-(2,2-diethyl-1,3-propanedialkoxyethoxysilyl)-1-propyl mercaptan; S-[3-(2,2-diethyl-1,propanedialkoxyisopropoxysilyl)-1-propyl]ethylthioether; bis[3-(2-methyl-1,3-propanedialkoxyethoxysilyl)-1-propyl] disulfide; bis[3-(2-methyl-1,3-propanedialkoxyisopropoxysilyl)-1-propyl]trisulfide; bis[3-(1,3-butanedialkoxymethylsilyl)-1-propyl]tetrasulfide; bis[3-(1,3-propanedialkoxymethylsilyl)-1-propyl]thioether; 3-(1,3-propanedialkoxyphenylsilyl)-1-propyl glycidyl thioether; tris-N,N',N''-[3-(1,2-propanedialkoxymethylsilyl)-1-propyl] melamine and tris-N,N',N''-[3-(1,2-propanedialkoxyphenylsilyl)-1-propyl]melamine, both derivable from propylene glycol; 3-(1,2-ethanedialkoxymethylsilyl)-1-propyl chloride and 3-(1,2ethanedialkoxyphenylsilyl)-1-propyl bromide, both derivable from ethylene glycol; 3-(neopentyl glycoxymethylsilyl)-1-propyl acetate and 3-(neopentyl glycoxyphenylsilyl)-1-propyl octanoate, both derivable from neopentyl glycol; 3-(2,3-dimethyl-2,3-butanedialkoxymethylsilyl)-1-propyl amine and 3-(2,3-dimethyl-2,3-butanedialkoxyphenylsilyl)-1-propyl amine, both derivable from pinacol; 3-(2,2-diethyl-1,3-propanedialkoxymethylsilyl)-1-propyl acrylate; 3-(2,2-diethyl-1,3-propanedialkoxyphenylsilyl)-1-propyl methacrylate; 3-(2-methyl-1,3-propanedialkoxyethylsilyl)-1-propyl glycidyl ether; 3-(2-methyl-1,3-propanedialkoxyphenylsilyl)-1-propyl acetate; 2-(2-methyl-2,4-pentanedialkoxymethoxysilyl)-1-ethyl acrylate; 2-(2-methyl-2,4-pentanedialkoxymethoxysilyl)-1-ethyl bromide; 2-(2-methyl-2,4-pentanedialkoxy methylsilyl)-1-ethyl benzenesulfonate; 2-methyl-2,4-pentanedialkoxyethoxysilylmethyl methacrylate; 2-methyl-2,4-pentanedialkoxyisopropoxysilylmethyl bromide; neopentylglycoxypropoxysilylmethyl amine; propyleneglycoxymethylsilylmethyl mercaptan; neopentylglycoxyethylsilylmethyl glycidyl ether; 2-(neopentylglycoxyisopropoxysilyl)-1-ethyl butyrate; 2-(neopentylglycoxy methylsilyl)-1-ethyl propionate; 2-(1,3-butanedialkoxymethylsilyl)-1-ethyl acrylate; 3-(1,3-butanedialkoxyisopropoxysilyl)-4-butyl methacrylate; 3-(1,3-butanedialkoxyethylsilyl)-1-propyl mercaptan; 3-(1,3-butanedialkoxymethylsilyl)-1-propyl methanesulfonate; 6-(2-methyl-2,4-pentanedialkoxyethoxysilyl)-1-hexyl amine; 1-(2-methyl-2,4-pentanedialkoxyethoxysilyl)-5-hexyl acrylate; 8-(2-methyl-2,4-pentanedialkoxyethoxysilyl)-1-octyl methacrylate; 10-(2-methyl-2,4-pentanedialkoxyethoxysilyl)-1-decyl glycidyl ether; 3-(2-methyl-2,4-pentanedialkoxyethoxysilyl)-1-propyl trifluoromethanesulfonate; 3-(2-methyl-2,4-pentanedialkoxypropoxysilyl)-1-propyl amine; N-[3-(2-methyl-2,4-pentanedialkoxyisopropoxysilyl)-1-propyl]ethylene diamine; tris-N,N',N''-[3-(2-methyl-2,4-pentanedialkoxybutoxysilyl)-1-propyl]diethylene triamine; tetrakis-N,N',N'', N''-[3-(2-methyl-2,4-pentanedialkoxyisopropoxysilyl)-1-propyl]triethylene tetramine; bis-(3-(2-methyl-2,4-pentanedialkoxyethoxysilyl)-1-propyl) sulfide; 6-(1,3-butanedialkoxyethoxysilyl)-1-hexyl amine; 1-(1,3-butanedialkoxyethoxysilyl)-5-hexyl glycidyl ether; 8-(1,3-butanedialkoxyethoxysilyl)-1-octyl acrylate; 10-(1,3-butanedialkoxyethoxysilyl)-1-decyl methacrylate; and, bis-(3-(2-methyl-2,4-pentanedialkoxyethoxysilyl)-1-propyl) thioether.

In another embodiment, the cyclic dialkoxy organofunctional silanes are cyclic and bridging dialkoxy analogs to the 3-chloro-1-propyltriethoxysilane (3-triethoxysilyl-1-propyl chloride), used as a starting point for the manufacture of silane coupling agents as, for example, polysulfide silanes, such as triethoxysilylpropyl tetrasulfide referred to herein as TESPT, triethoxysilylpropyl disulfide referred to herein as TESPD. The cyclic and bridging dialkoxy haloalkyl silanes are novel and excellent alternatives to 3-triethoxysilyl-1-propyl chloride for use where reduced VOC emissions are desired.

The cyclic and bridging dialkoxy organofunctional silane compositions included herein can comprise single components or various mixtures of individual cyclic and bridging dialkoxy organofunctional silane components, organofunctional silane components, which contain only monofunctional alkoxy groups, and optionally including other species as well. Synthetic methods result in a distribution of various silanes, wherein mixtures of the starting components are employed for the purpose of generating mixtures of cyclic and bridging dialkoxy organofunctional silane products. Moreover, it is understood that the partial hydrolyzates and/or condensates of these cyclic and bridging dialkoxy organofunctional silanes, also referred to as cyclic and bridging dialkoxy organofunctional siloxanes and/or silanols, can be encompassed by the silanes herein as a side product of most methods of manufacture of the cyclic and bridging dialkoxy organofunctional silanes. Also, the partial hydrolyzates and/or condensates can occur upon storage of the cyclic and bridging dialkoxy organofunctional silanes, especially in humid conditions, or under conditions in which residual water remaining from their preparation is not completely removed subsequent to their preparation. Furthermore, partial to substantial hydrolysis of the cyclic and bridging dialkoxy organofunctional silanes can be deliberately prepared by incorporating the appropriate stoichiometry or excess of water into the methods of preparation described herein for the silanes. Also, the siloxane content of the cyclic and bridging dialkoxy organofunctional silanes can be deliberately prepared by incorporating the appropriate stoichiometry or excess of water into the methods of preparation for the silanes described herein. Silane structures herein encompassing hydrolyzates and siloxanes are described in the structures given in Formula 1 wherein the subscripts, v, of $Z^b$=(—O—)$_{0.5}$ and/or u, of X=OH can be substantive, meaning substantially larger than zero.

The cyclic and bridging dialkoxy organofunctional silane compositions, if liquid, can be loaded on a carrier or a mixture of more than one carrier, such as a porous polymer, carbon black, or an inorganic filler, such as silica, alumina, various clays, etc. By loading the composition on a carrier it is in solid form for delivery to the polymer formulation. In another embodiment, the carrier would be part of the filler, either intimately absorbed onto or within, or chemically bound to the filler.

The silane compounds with heterocyclic silicon groups included herein can be prepared by transesterification of organofunctional alkoxy-substituted silanes and diols with or without a catalyst, by the esterification of organofunctional silyl halides with diols, or by the hydrosilylation of substituted alkenes with a hydrosilane containing a heterocylic silicon group to generate cyclic and bridging silane compositions.

The transesterification of organofunctional alkoxy-substituted silanes and diols can be conducted with or without a catalyst. The catalyst can be an acid, a base or a transition metal catalyst. Suitable acid catalysts are hydrochloric acid, p-toluenesulfonic acid and the like. Typical base catalysts are sodium methoxide and sodium ethoxide. Suitable transition metal catalysts are tetraisopropyl titanate and dibutyltin dilaurate.

During esterification of organofunctional silyl halides with diols, diols are added to the silyl halide with removal of the hydrogen halide formed. The hydrogen halide can be removed by sparging with nitrogen or by using reduced pressure. Any remaining halo groups can be removed by the addition of an alcohol such as methanol, ethanol, isopropanol and the like.

In another embodiment of the present invention, the diol-derived organofunctional silane can be prepared by reacting a catalyzed mixture of organofunctional silane reactant and diol with simultaneous distillation. The reaction leads to the alcohol exchange of one or more of the alkoxy groups selectively at the silicon atom of the organofuctioal silane reactant with the diol. The reaction is driven by the removal of the more volatile by-product alcohol by distillation. Suitable catalysts include acids such asp-toluenesulfonic acid, sulfuric acid, hydrochloric acid, chlorosilanes, chloroacetic acids, phosphoric acid, their mixtures and so forth; bases such as sodium ethoxide; and, transition metal-containing catalyst such as titanium alkoxides, titanium-containing chelates, zirconium alkoxides, zirconium-containing chelates and mixtures thereof.

In yet another embodiment of the present invention, the diol-derived organofunctional silane can be prepared by catalyzing a mixture of organofunctional silane and diol, in a first embodiment, at a molar ratio of at least about 0.5 moles of diol per alkoxy-silyl group to be transesterified, in a second embodiment, at a molar ratio of from about 0.5 to about 1.5 for a trialkoxy silane; and, in a third embodiment, from about 1.0 to about 1.5 for a trialkoxy silane. In each of the foregoing embodiments, the reaction temperature can range from about 10° C. to about 150° C. and in another embodiment from about 30° C. to 90° C. while maintaining a pressure in the range of from about 0.1 to about 2000 mm Hg absolute, and in another embodiment, from about 1 to about 80 mm Hg absolute. Excess diol can be utilized to increase reaction rate.

In another embodiment the diol-derived organofunctional silane can be prepared by slowly adding diol to organofunctional silane in the presence of catalyst at the desired reaction temperature and under vacuum. If desired, a neutralization step can be utilized to neutralize any acid or base catalyst that may have been utilized thereby improving product storage.

Optionally, an inert solvent can be used in the process. The solvent can serve as a diluent, carrier, stabilizer, refluxing aid or heating agent. Generally, any inert solvent, i.e., one which does not enter into the reaction or adversely affect the reaction, can be used. In one embodiment, solvents are those which are liquid under normal conditions and have a boiling point below about 150° C. Examples include aromatics, hydrocarbons, ethers, aprotic solvents and chlorinated hydrocarbon solvents such as, toluene, xylene, hexane, butane, diethyl ether, dimethylformamide, dimethyl sulfoxide, carbon tetrachloride, methylene chloride and so forth.

In another embodiment of the present invention, the diol-derived organofunctional silane can be prepared by continuously premixing the flow-streams of organofunctional silane reactant, diol and catalyst (when employed) at appropriate ratios and then introducing the premixed reactants into a reactive distillation system, in one embodiment, a thin film distillation device operating at the desired reaction temperature and vacuum conditions. Conducting the reaction in a thin film under vacuum accelerates the removal of the alcohol by-product and improves the transesterification reaction rate. The vaporization and removal of the by-product alcohol from the film shifts the chemical equilibrium of the reaction to favor formation of the desired product and minimizes undesired side reactions.

The foregoing embodiment of the process herein comprises the steps of:

a) reacting, in a thin film reactor, a thin film reaction medium comprising organofunctional silane, e.g., a thiocarboxylate silane, diol and catalyst to provide diol-derived organofunctional silane and by-product alcohol;

b) vaporizing the by-product alcohol from the thin film to drive the reaction;

c) recovering the diol-derived organofunctional silane reaction product;

d) optionally, recovering the by-product alcohol by condensation; and, e) optionally, neutralizing the diol-derived organofunctional silane product to improve its storage stability.

The molar ratio of diol to organofunctional silane reactant used in the foregoing continuous thin film process will depend upon the number of alkoxy groups that are desired to be replaced with diol. In one embodiment of the thin film process, a stoichiometric equivalent molar ratio of 1 is used wherein one diol replaces two alkoxy groups. Generally, for the practice of this embodiment, the molar ratio of diol to organofunctional silane can be varied within a range of from about 95 to about 125 percent of stoichiometric equivalence for each alkoxy-silyl group to be transesterified. In a particular embodiment, the molar ratio of diol to organofunctional silane can be within the range of from about 100 to about 110 percent of stoichiometric equivalence. In another embodiment, the molar ratio can be within a range of from about 100 to about 105 percent of stoichiometric equivalence for the molar ratio of diol to organofunctional silane. Those skilled in the art will recognize that excess diol could be utilized to increase reaction rates but such is ordinarily of no significant advantage when conducting the reaction in a thin film and only adds to the expense.

The apparatus and method of forming the film are not critical and can be any of those known in the art. Typical known devices include falling film or wiped film evaporators. Minimum film thickness and flow rates will depend on the minimum wetting rate for the film forming surface. Maximum film thickness and flow rates will depend on the flooding point for the film and apparatus. Vaporization of the alcohol from the film is effected by heating the film, by reducing pressure over the film or by a combination of both. It is preferred that mild heating and reduced pressure are utilized to form the diol-derived organofunctional silane of this invention. Optimal temperatures and pressures (vacuum) for running the thin film process will depend upon the specific starting organofunctional silane's alkoxy groups and diol used in the process. The present invention will be described more specifically by referring to the exemplary embodiments thereof. However, it should be noted that the present invention is not limited only to the following exemplary embodiment.

In accordance with an exemplary embodiment of the present invention, a process for the preparation of a silane composition is provided comprising reacting at least one organofunctional silane with a diol in the presence or absence of catalyst to provide a diol-derived organofunctional silane.

In a first embodiment of the present invention, the silane compound is present in the range of from about 0.1 to about 10 weight percent, and all ranges therebetween, based on the total weight of the polymer, in a second embodiment in the range of from about 0.3 to about 3 weight percent, in a third embodiment in the range of from about 0.5 to about 2 weight percent.

The term "silane-modified polymer," as used herein, denotes a polymer to be crosslinked which is obtained by chemically introducing silane represented by Formula 1 as described above into its structure, e.g., employing a free radical generator.

The free radical generators that can be employed in the present invention are those that decompose upon heating and generate free radicals. The free radical generators can be organic peroxides or peresters. The term organic peroxide is meant to include benzoyl peroxide, dichlorobenzoyl peroxide, dipropionyl peroxide, t-butyl peroxyisobutyrate or lauroyl peroxide; organic peroxides such as t-butyl peracetate, t-butyl peroxy-2-ethyl hexanoate, or t-butyl peroxy isobutyrate, t-butyl peroxy benzoate, dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 2,5-di(peroxybenzoate)hexyl-3 or 1,3-bis(t-butyl-peroxyisopropyl)benzene; azo compounds such as azobisisobutyronitrile, azoisobutylvaleronitrile or dimethyl azodiisobutyrate; ketone peroxides such as methyl ethyl ketone peroxide, cyclohexanone peroxide or 1,1-bis(t-butylperoxy)-3,5,5-trimethylcyclohexane; hydroperoxides such as t-butyl hydroperoxide, cumene hydroperoxide, diisopropylbenzene hydroperoxide, para-menthane hydroperoxide or 2,5-dimethylhexane-2,5-dihydroperoxide; dialkyl peroxides such as di-t-butyl peroxide, and peroxy esters such as t-butylperoxy acetate, t-butylperoxy benzoate, di-t-butyl-diperoxy phthalate, 2,5-dimethyl-2,5-di(benzoyl peroxy) hexane, t-butylperoxy maleate or t-butylperoxy isopropyl carbonate. In an embodiment, the free radical generator is dicumyl peroxide, 2,5-dimethylhexane-2,5-dihydroperoxide, and 2,5-dimethyl-2,5-di(t-butylperoxy)hexane or molecular oxygen. The free radical generators described above can be used either alone or as a mixture of two or more. According to another embodiment, the free radical generator is an organic peroxide such as benzoyl peroxide, dichlorobenzoyl peroxide, dicumyl peroxide, alpha-bis(tert-butylperoxy) di-isopropylbenzene or di-tertiary butyl peroxide. According to an embodiment of the present invention, the free radical generator is dicumyl peroxide. The criteria for choosing an appropriate free radical generator are known to persons skilled in the art and are described in the above-mentioned U.S. Pat. No. 3,646,155, which is incorporated herein by reference and will not be repeated here.

The amount of the free radical generator can be varied over wide ranges, for example, from about 0.01 weight percent to about 0.4 weight percent, and all ranges therebetween, based on the total weight of the polymer. According to another embodiment, the amount of the free radical generator is about 0.02 to about 0.2 weight percent. According to yet another embodiment, the amount of the free radical generator is about 0.02 to about 0.1 weight percent.

If desired, a chain transfer agent can, optionally, be employed in the present invention to deactivate any portion of the free radical generator which remains unreacted at the time the silane-modifying polymer is in the presence of the free radical generator. Examples of suitable chain transfer agents are dodecyl mercaptan, t-butyl mercaptan, n-butyl mercaptan, octyl mercaptan and alpha-methylstyrene. The chain transfer agent inhibits the crosslinking reaction of, for example, polyethylene and permits the silane compound-bonding reaction to proceed effectively.

According to an embodiment of the present invention, the chain transfer agent is a paraffin such as methane, ethane, propane, butane, and pentane; alpha-olefins such as propylene, butene-1, and hexene-1; aldehydes such as form aldehyde, acetaldehyde, and n-butylaldehyde; ketones such as acetone, methyl ethyl ketone, and cyclohexanone; aromatic hydrocarbons, and chlorohydrocarbons.

Further, when such a chain transfer agent is used, it is present in the amount of from about 0.01 to about 0.5 part by weight per 100 parts by weight of the silane-modified polymer. According to another embodiment, the chain transfer agent can be used in the amount of from about 0.03 to about 0.1 part by weight per 100 parts by weight of the silane-modified polymer.

The introduction of the silane into the structure of the polymer to be crosslinked should ordinarily be accomplished under substantially anhydrous conditions in order to preclude any significant amount of premature hydrolysis/condensation of silane moieties. Only after the selected silane has been chemically introduced into the selected polymer(s) will the crosslinkable composition be exposed to a source of moisture that will result in hydrolysis/condensation whereby the polymer(s) will become crosslinked. Although this step can be accomplished in the absence of catalyst, one may optionally employ hydrolysis/condensation catalyst to accelerate crosslinking.

The optional hydrolysis/condensation catalyst can be an organic base, a carboxylic acid or an organometallic compound including organic titanates and complexes or carboxylates of lead, cobalt, iron, nickel, zinc and tin.

According to another embodiment of the present invention, the hydrolysis/condensation catalyst is an organometallic compound such as dibutyltin dilaurate, stannous acetate, stannous octanoate (stannous caprylate), lead naphthenate, zinc caprylate, iron 2-ethylhexanoate, cobalt naphthenate; titanic acid esters and titanium chelate compounds [e.g., tetrabutyl titanate, tetranonyl titanate, or bis(acetylacetonitrile) diisopropyl titanate]; an organic base such as ethylamine, hexylamine, dibutylamine, piperidine or pyridine; an acid such as inorganic acids (e.g., hydrochloric acid and phosphoric acid) or a fatty acid (e.g., stearic acid, linoleic acid and octylic acid). These catalyst compounds can be used either alone or as mixtures. According to another embodiment of the present invention, zinc salts of higher carboxylic acids, such as zinc salts of aliphatic or alicyclic carboxylic acids containing 8 to 20 carbon atoms, can be used. According to yet another embodiment of the present invention, the catalyst is an alicyclic carboxylic acid containing 8 to 17 carbon atoms. According to still another embodiment, examples of these zinc salts include zinc stearate, zinc octanoate, zinc laurate, and zinc naphthenate. According to still yet another embodiment of the present invention, the zinc salt is zinc stearate.

The higher carboxylic acid zinc salts can be mixed with a minor amount of another silane hydrolysis/condensation catalyst of the above-exemplified species, for example, organotin compounds such as dibutyltin dilaurate, dibutyltin maleate or dibutyltin diacetate. The amount of the other catalyst in the mixture should be minimized. For example, the other catalyst is limited to not more than 5% based on the total weight of the mixed catalyst.

According to another embodiment of the present invention, the catalyst is selected from the group consisting of dibutyltin dilaurate, dibutyltin diacetate, dibutyltin octanoate, dioctyltin maleate, dioctyltin dilaurate, dibutyltin oxide, di-octyl tin-bis(isooctylmaleate), di-octyl-tin-bis(isooctylthioglycolate) and titanium compounds such as titanium-2-ethylhexoxide. According to another embodiment of the present invention, the catalyst is dibutyltin dilaurate.

The hydrolysis/condensation catalyst, if utilized herein, will typically be present, in a first embodiment, in an amount of from about 0.01 to about 1.0 weight percent, in a second embodiment from 0.05 to about 0.5 weight percent, in a third embodiment from 0.1 to about 0.2 weight percent, based upon the total weight of polymer to be crosslinked.

Optionally, blowing agents can be incorporated in the present invention to produce polymer foams. The blowing agents are blowing agents that decompose at a temperature of more than 140° C. to generate gas. According to another embodiment, the blowing agents decompose between about 170° C. to about 220° C. to generate gas. According to another embodiment, the blowing agent is azodicarbonamide, dinitrosopentamethylenetetramine, p,p'-oxybis(benzenesulfonylhydrazide), N,N'-dimethyl-N,N'-dinitrosoterephthalamide and the like, or a physical blowing agent such as hydrocarbons (for example, butane, pentane) and halogenated hydrocarbons (for example, methylchloride). The above-enumerated blowing agents can be used individually or in any combination thereof. According to another embodiment, the blowing agent is azodicarbonamide. Azodicarbonamide is especially advantageous because of its good thermal stability and suitable decomposition temperature.

The amount of the blowing agent can be varied over a wide range according, for example, to the degree of expansion required of the final foamed shaped article. Usually, the blowing agent is present in the amount of at least 0.1 part by weight per 100 parts by weight of the silane-modified polymer. According to another embodiment, the blowing agent is present in the amount of about 1 to about 30 parts by weight per 100 parts by weight of the silane-modified polymer. According to yet another embodiment, the blowing agent is present in the amount of about 10 to about 20 parts by weight per 100 parts by weight of the silane-modified polymer.

When a heat-decomposition blowing agent is employed, the free radical generator used for introducing silane into its structure of the polymer to be crosslinked advantageously has the same or similar decomposition temperature as that of the blowing agent, thus decomposing simultaneously with the decomposition of the blowing agent. The free radical generator can be an organic peroxide having a decomposition temperature of greater than 140° C., e.g., a decomposition temperature in the range of about 170° C. to about 220° C.

Optionally, one or more known and conventional additives can be included in the composition of the present invention including, for example, carbon black, talc, calcium carbonate, foaming agents, lubricants, antioxidants, compatibilisers, mineral fillers, flame-retardant additives, stabilizers inhibiting deterioration by ultraviolet rays, stabilizers inhibiting deterioration by heavy metals, coloring agents, fillers, plastiziers, processing aids, pigments, heat stabilizers, compatibilizing agents, alumina trihydrate, zeolites, chalk, mica, silica, or silicates, and stabilizers against electric voltage.

According to another embodiment of the present invention, the coloring agent can be cadmium yellow, quinacridone red, cobalt blue, cadmium red, red iron oxide, titanium oxide, zinc oxide or carbon black; nucleating agents can be talc, diatomaceous earth, calcium carbonate, zinc stearate or and aluminum stearate; lubricants can be paraffin or stearic acid; stabilizer can 2-hydroxy-4-methoxybenzophenone or 2,6-di-tert-butyl hydroxytoluene; fire retardants can be antimony oxide or chlorinated paraffin; fillers can be calcium oxide, magnesium oxide, sodium carbonate, potassium carbonate, strontium carbonate, barium sulfate, lithopone, magnesium carbonate, calcium carbonate, silica, kaolin clay or talc; foaming aids can be zinc oxide, zinc stearate or zinc octanoate, and deterioration inhibitors can be t-butyl p-cresol or dilauryl thiopropionate in the amounts usually employed in the art.

According to another embodiment of the present invention, minerals for improving flame retardancy or as an internal source of water for the crosslinking, e.g. alumina trihydrate, zeolites or mineral fillers like chalk, talc, mica, silica, silicates or carbon black, can be used.

In accordance with another embodiment of the process of the invention, crosslinking of polymer is achieved by the process which comprises:
 a) combining under substantially moisture-free conditions:
  (i) thermoplastic base polymer,
  (ii) solid carrier polymer,
  (iii) hydrolyzable silane which, upon hydrolysis of its hydrolyzable sites, produces a reduced amount of volatile organic compound compared to that produced by the hydrolysis of a silane possessing an equivalent number of hydrolyzable sites all of which are hydrolyzable alkoxy groups,
  (iv) a free radical generator and, optionally,
  (v) catalyst for the hydrolysis/condensation reactions of silane (iii) when silane (iii) is exposed to moisture;
 b) heating the combination resulting from step (a) at a temperature above the crystalline melting point of base polymer (i) to graft silane (iii) to base polymer (i); and,
 c) exposing the product resulting from step (b) to moisture to effect hydrolysis/condensation of grafted silane (iii) thereby providing crosslinked base polymer (i).

In accordance with another exemplary embodiment, step (a) in the foregoing process can be carried out by: (a1) combining carrier polymer (ii), silane (iii) and free radical generator (iv) to provide a preblend in which silane (iii) and free radical generator (iv) are physically incorporated in carrier polymer (ii); and, (a2) combining the preblend resulting from step (a1) with base polymer (i), optionally with catalyst (v). In conducting (a1), the silane (iii) and free radical generator (iv) can be, if desired, combined to form a mixture, the resulting mixture thereafter being combined with carrier polymer (ii) to form the preblend.

In conducting step (a2), the base polymer (i) and catalyst (v) can, if desired, be combined to provide a mixture, the resulting mixture thereafter being combined with the preblend resulting from step (a1).

Carrier polymer (ii) can be present within in its admixture with base polymer (i), e.g., in a first embodiment at a level of from about 0.01 to about 40 weight percent, and in a second embodiment at a level of from 0.1 to about 20 weight percent.

Base polymer (i) is any thermoplastic polymer or combination of polymers, described above, into which silane is introduced prior to crosslinking. Base polymer (i) is typically provided in pellet or granular form.

Silane (iii) suitable for grafting onto and crosslinking with base polymer (i) according to the present invention include silanes of general Formula 1 as described above.

The amount of silane (iii) employed will be that which provides the desired degree of crosslinking. The amount of silane (iii) based on the weight of the base polymer (i), e.g., polyethylene, is not narrowly critical and can range from about 0.01 to about 10 weight percent, and all ranges therebetween, of silane based on the total weight of the base polymer. According to another embodiment, the silane compound ranges from about 0.05 to about 3 weight percent based on the total weight of the base polymer. According to yet another embodiment, the silane compound ranges from about 0.05 to about 0.2 weight percent based on the total weight of the base polymer.

Free radical generators suitable for initiating the grafting of silane onto the base polymer (i) include any of the free radical generators described above.

Hydrolysis/condensation catalysts suitable for crosslinking the base polymer include the catalysts described above.

Carrier polymer (ii) used in the present invention is solids and should be compatible with base polymer (i). "Compatible" means that the carrier polymer will not readily react with silane (iii) and will be dispersible or soluble in the base polymer at the melt temperature of the latter. Examples of suitable carrier polymers are non-hygroscopic, that is, absorption of moisture is comparatively low to minimize the possibility of premature hydrolysis and condensation of the silane. In any event, the carrier polymer should be substantially free of water. In general, carrier polymers of the present invention are particulates in the form of powder, granules, or pellets. According to another embodiment of the present invention, the particulates are in the form of pellets.

Carrier polymer (ii) must be capable of physically incorporating a silane represented by Formula 1 as described above while still retaining its particulate and solid characteristics. The three classes of carrier polymer (ii) are porous, sponge-like carrier polymers, swellable polymers and encapsulates.

Porous polymers are capable of incorporating the silane in the pores. Porous sponge-like carrier polymers suitable for taking up silane can be prepared, for example, from various high and low density polyethylenes and polypropylenes. According to an embodiment, the carrier polymer can be ethylene vinyl acetate (EVA) copolymer, high density polyethylene, low density polyethylene or linear low density polyethylene. The pore volume of the porous polymer is large enough to hold a relatively large volume of silane. The pore volume is generally from about 10 to about 90% of the porous polymer. According to another embodiment of the present invention, the pore volume is from about 30 to about 90%. The cross-section of the pores is generally in the range of about 0.1 to about 5 µm and the cell size is generally from about 1 to about 30 µm. These porous polymers can take up about 0.5 to about three times their weight of silane. The porous polymers can be employed as carrier polymers in powder, granular, or pellet form. Suitable porous polymers are commercially available and can be obtained from ENKA AG, Accurel Systems, Postfach, 8753 Obernberg, FRG, or prepared as taught in U.S. Pat. No. 4,247,498, which is incorporated herein by reference.

Swellable polymers are capable of incorporating the silane by being swelled by the silane. The carrier polymer can also be chosen from polymers that are readily swelled by the silane and optionally the peroxide, hydrolysis/condensation catalyst, stabilizers, and other additives where these can be mixed with or dissolved in the silane to form a liquid mixture. One polymer suitable for this purpose is EVA, especially EVA having a high vinyl acetate content ranging from about 18 to about 45 percent by weight. Such a swellable carrier polymer can be used in granule, powder, pellet, or other solid form. According to another embodiment of the present invention, the carrier polymer should be chosen so that the amount of silane that it can absorb without becoming wet or sticky is a minimum of about 10% by weight.

In practice it has been found that suitable swelled pellets containing about 20% vinlytrimethoxysilane can be prepared from EVA made from 26% vinyl acetate monomer. Polyethylene is not generally suitable as a swellable carrier polymer because it does not readily absorb sufficiently large amounts of silanes.

A third class of carrier polymer (ii) is an encapsulate. The silane is encapsulated, i.e., contained with a thermoplastic polymer capsule. Suitable polymers useful as encapsulates in the present invention are polyolefins. Suitable polyolefins can be either a homopolymer of an alpha-olefin having 2 to 6 carbon atoms or a copolymer of two alpha-olefins. For example, encapsulation of the silane in the carrier polymer (ii) would produce a suitable solid form of the silane.

The amount of carrier polymer (ii) is ordinarily selected to be the minimum amount needed to contain the desired amount of silane and, optionally, one or more other additives in a dry, easily handled form.

Generally, absorption of the silane, alone or with other additives in liquid form, into the carrier polymer in the process of the present invention is accomplished by tumble blending, the carrier polymer, silane, and, optionally, the other additives together. Tumble blending, for example, can be accomplished in a Conus blender. If not all additives are liquid, then any solid components should first be dissolved in the silane. The blending is carried out under a blanket of nitrogen, carbon dioxide, or dry air in a closed system to maintain the silane substantially free of water and to minimize evaporation of the liquid ingredients. Optionally, during blending heat can be applied. The container in which the blending takes place must be non-reactive with the silane and other additives. The absorption of silane and any other liquid additive into the carrier polymer is carried out prior to feeding the silane into the mixing or compounding apparatus. Additives absorbed into the carrier polymer along with the silane can be incorporated, for example, at about 0.5 to about 50 weight percent of the carrier polymer, in another embodiment from about 0.5 to 10 weight percent, and in yet another embodiment from about 1.0 to 2.5 weight percent.

According to another embodiment of the present invention, the process temperature generally ranges above the crystalline melting point of the base polymer, i.e., between 120° C. and the degradation temperature of the polymer. According to another embodiment, the temperature of the process ranges from about 150° C. to about 225° C. The actual processing temperature employed will normally be determined by consideration of polymers being processed and the type of apparatus in which the process is performed.

The process of the present invention can be carried out employing any suitable apparatus. According to an embodiment of the present invention, the process is carried out under conditions in which the base polymer and solid carrier polymer containing silane of the present invention are subjected to mechanical working, such as kneading or compounding. The process is, therefore, carried out in, for example, an extruder. The use of such an apparatus to produce a crosslinked polymer is explained in detail in U.S. Pat. No. 5,112,919, the contents of which are incorporated by reference herein. Common extruders are the single or twin screw type. Other apparatus that can be employed can include a Buss Cokneader or a Banbury mixer. Such compounding equipment may be preferred to an extruder where the grafting reaction is to be performed and then the crosslinked polymer is to be stored for a period of time prior to fabrication.

The polymers as described above are reacted in the molten state with a silane having the general formula 1 described above.

The free radical generator is incorporated into the polymer to initiate the graft polymerization reaction.

Subjecting the composition thus produced to moisture, optionally at an elevated temperature, will induce crosslinking of the silane groups via a combined hydrolysis and condensation reaction. Atmospheric moisture is usually sufficient to permit the crosslinking to occur, but the rate of crosslinking can be increased by the use of an artificially moistened atmosphere, or by immersion in liquid water. Also, subjecting the composition to combined heat and moisture will accelerate the crosslinking reaction. The crosslinking may be effected at a temperature above 50° C. According to another embodiment, the crosslinking is performed by exposing the composition to a temperature of about 85° C. and a relative humidity of about 90% for approximately 100 hours.

Alternatively, it may be desirable to store the crosslinkable polymer of the present invention for some time prior to fabrication and crosslinking, then the hydrolysis/condensation catalyst should not be added during the production of the silane-modified polymer. Instead, the hydrolysis/condensation catalyst should be mixed with the crosslinkable polymer at the fabrication step.

The following nonrestrictive examples are further illustrative of the invention.

Examples 1-2

These examples illustrate the preparation of diol-derived organofunctional silanes (designated Vinyl Silanes A and B, respectively) which will later be grafted to polyolefin followed by crosslinking of the grafted polyolefin.

Example 1

Preparation of Vinyl Silane A

Vinyl Silane A was prepared by the following method: 1173.4 grams (6.16 moles) of vinyltriethoxy silane (Silquest® A-151, available from GE Silicones) and 9.5 grams of a sulfonated ion exchange resin (Purolite CT-275 catalyst, available from Purolite Co., Inc.) were added to a 3 L round bottom flask equipped with an Oldershaw five plate distillation column, short path distillation head, and addition funnel. 728.3 grams (6.16 moles) of hexylene glycol (available from Sigma-Aldrich Chemical Co.) was charged to the addition funnel. The contents of the flask were heated to about 50° C. under vacuum at about 90 mm Hg. The hexylene glycol was charged over a period of about 3 hours to the flask. After addition was completed, the vacuum was slowly increased to maintain a steady distillation of ethanol. Distillation was continued until full vacuum and a pot temperature of about 56° C. was obtained. The material was then allowed to cool for 12 hours and was filtered to remove the Purolite catalyst. Next, the material was placed in a 2 L round bottom flask equipped with an Oldershaw five plate distillation column, and the remaining ethanol was removed at ambient pressure and a pot temperature of about 80° C. to yield approximately 1097 grams of Vinyl Silane A.

Example 2

Preparation of Vinyl Silane B

Vinyl Silane B was prepared by the following method: 633.8 grams (2.22 moles) of vinyltriethoxy silane (Silquest® A-151, available from GE Silicones), 4.7 grams of a sulfonated ion exchange resin (Purolite CT-275 catalyst, available from Purolite Co., Inc.) and 300.0 grams (2.22 moles) of 1,3-butanediol (available from Sigma-Aldrich Chemical Co.) were added to a 3 L round bottom flask equipped with an Oldershaw five plate distillation column, short path distillation head, and addition funnel. The contents of the flask were heated to about 40° C. under vacuum at about 60 mm Hg. The vacuum was slowly increased to maintain a steady distillation of ethanol. Distillation was continued until full vacuum and a pot temperature of about 60° C. was obtained. The material was then allowed to cool for about 12 hours and was filtered to yield approximately 536.0 g of Vinyl Silane B.

Examples 3 and 4; Comparative Example 1

Examples 3 and 4 describe the preparation of vinyl silane-containing compositions based on Vinyl Silane A (Example 1) and Vinyl Silane B (Example 2), respectively. Comparative Example 1, provided as a control, describes the preparation of a vinyl silane-containing composition based on vinyltriethoxy silane (Silquest® A-151).

Vinyl silane-containing compositions were prepared by mixing each of the foregoing silanes with the ingredients and in the amounts (grams) indicated in Table 1. All ingredients of the compositions were combined and stirred at ambient temperature in a closed, dry glass vessel until a homogeneous composition was obtained.

TABLE 1

| Vinyl Silane-Containing Compositions | | | |
|---|---|---|---|
| Ingredient | Example 3 | Example 4 | Comparative Example 1 |
| Vinyltriethoxy silane | — | — | 179.9 |
| Vinyl Silane Composition A (Example 1) | 204.5 | — | — |
| Vinyl Silane Composition B (Example 2) | — | 178 | — |
| Dicumyl Peroxide | 15 | 14.8 | 15 |

TABLE 1-continued

Vinyl Silane-Containing Compositions

| Ingredient | Example 3 | Example 4 | Comparative Example 1 |
|---|---|---|---|
| Dibutyltin Dilaurate | 5 | 4.94 | 5 |
| BHT (2,6-Di-tert-butyl-4-methylphenol (99%)) | 0.1 | 0.05 | 0.1 |

Examples 5-14, Comparative Examples 2-6

Examples 5 and 6 describe the absorption of vinyl silane-containing compositions of Examples 3 and 4, and Comparative Example 2 describes the absorption of the vinyl silane-containing composition of Comparative Example 1, in separate quantities of a carrier polymer. The carrier polymer was a porous high density polyethylene (HDPE) having a density of about 0.95 grams/cm$^3$. Each quantities of carrier polymer with its vinyl silane-containing composition absorbed therein was prepared by the following method: a dry, sealable glass jar was filled to about three-quarters of its capacity with the carrier polymer in pellet form. Next, a vinyl silane-containing composition was added in a 40:60 weight % ratio of vinyl silane-containing composition:carrier polymer. The jar was then sealed and rotated on motorized rubber rollers for about 25-30 minutes at ambient temperature after which the vinyl silane-containing composition was completely absorbed in the carrier polymer. The pellets so obtained (Examples 5 and 6 and Comparative Example 2) were stored in a dry atmosphere in a sealed container.

Examples 7-10 and 11-14 describe the preparation of physical mixtures including the pellets of Examples 5 and 6, respectively, and a base polymer of high density polyethylene (HDPE), and Comparative Examples 3-6 describe the preparation of physical mixtures including the pellets of Comparative Example 2 and a base polymer of HDPE. The HDPE base polymer used in these examples had a density of 0.944 g/cc and a melt flow of 3.5 grams/10 min. at 190° C. The physical mixtures were prepared by the following method: The pellets and HDPE were charged to a Maguire weigh scale blender in the amounts indicated in Table 2 and blended.

TABLE 2

Polymer Feed to the Extruder

| | Carrier Polymer with Vinyl Silane-Containing Composition | HDPE | Amount of Vinyl Silane in |
|---|---|---|---|
| Example | Example | Weight Percent | Weight Percent | the Total Polymer Weight Percent |
| 7 | 5 | 1.266 | 98.734 | 0.5 |
| 8 | 5 | 2.564 | 97.436 | 1.0 |
| 9 | 5 | 3.896 | 96.104 | 1.5 |
| 10 | 5 | 5.263 | 94.737 | 2.0 |
| 11 | 6 | 1.266 | 98.734 | 0.5 |
| 12 | 6 | 2.564 | 97.436 | 1.0 |
| 13 | 6 | 3.896 | 96.104 | 1.5 |
| 14 | 6 | 5.263 | 94.737 | 2.0 |

| Comparative Example | Comparative Example | Weight Percent | HDPE (Weight Percent) | Amount of Vinyl Silane in the Total Polymer (Weight Percent) |
|---|---|---|---|---|
| 3 | 2 | 1.266 | 98.734 | 0.5 |
| 4 | 2 | 2.564 | 97.436 | 1.0 |
| 5 | 2 | 3.896 | 96.104 | 1.5 |
| 6 | 2 | 5.263 | 94.737 | 2.0 |

Examples 15-22; Comparative Examples 7-10

These examples illustrate the grafting of silane to base polymer in physical mixtures of Examples 7-14 and Comparative Examples 3-6, supra.

The physical mixtures of Examples 7-14 and Comparative Examples 3-6 were individually fed to a Hartig single screw extruder equipped with a 2 inch single screw of 30:1 Length/Diameter (L/D) ratio, Maddox mixing head, and breaker plate containing 40, 60, and 80 mesh screen packs and extruded under the conditions indicated below in Table 3 resulting in the grafting of the silane of each mixture onto its HDPE component. Each of the resulting extrudates was quenched in water, dried with a Berringer water stripper and pelletized on a Cumberland pelletizer.

TABLE 3

Extrusion Conditions

| | Ex. 15 | Ex. 16 | Ex. 17 | Ex. 18 | Ex. 19 | Ex. 20 | Ex. 21 | Ex. 22 | Comp. Ex. 7 | Comp. Ex. 8 | Comp. Ex. 9 | Comp. Ex. 10 |
|---|---|---|---|---|---|---|---|---|---|---|---|---|
| Physical Mixture | Ex. 7 | Ex. 8 | Ex. 9 | Ex. 10 | Ex. 11 | Ex. 12 | Ex. 13 | Ex. 14 | Comp. Ex. 3 | Comp. Ex. 4 | Comp. Ex. 5 | Comp. Ex. 6 |
| Zone 1 (Set at 170° C./Actual Temp.) | 167 | 169 | 168 | 167 | 167 | 169 | 168 | 170 | 168 | 170 | 169 | 167 |
| Zone 2 1 (Set at 190° C./Actual Temp.) | 188 | 190 | 188 | 188 | 188 | 186 | 188 | 189 | 190 | 188 | 187 | 189 |
| Zone 31 (Set at 210° C./Actual Temp.) | 210 | 211 | 211 | 211 | 214 | 210 | 210 | 212 | 212 | 210 | 213 | 210 |
| Zone 41 (Set at 220° C./Actual Temp.) | 222 | 222 | 222 | 222 | 221 | 220 | 223 | 221 | 221 | 222 | 218 | 219 |
| Zone 5 (Temp. Off) | off | off | off | Off | off | off | off | off | off | off | off | off |
| Zone 61 (Set at 220° C./Actual Temp.) | 218 | 220 | 221 | 220 | 219 | 219 | 218 | 220 | 222 | 220 | 221 | 220 |
| Die1 (Set at 220° C./Actual Temp.) | 220 | 217 | 217 | 218 | 220 | 219 | 221 | 220 | 220 | 221 | 221 | 220 |
| Speed (RPM set at 45/Actual) | 45 | 45 | 45 | 45 | 45 | 45 | 45 | 45 | 45 | 45 | 45 | 45 |
| Pressure (psi) | 1400 | 1615 | 1712 | 1710 | 1432 | 1755 | 1995 | 2255 | 1522 | 1620 | 1780 | 1920 |
| Load (Amps) | 38 | 39 | 40 | 40.5 | 37 | 38 | 39 | 40 | 37 | 39 | 43 | 44 |
| Output (lbs/hr) | 37.4 | 38.2 | 38.6 | 38.2 | 31.2 | 33.9 | 34.3 | 34.1 | 36.9 | 35.7 | 34.8 | 35.6 |

Example 23-30; Comparative Examples 11-14

These examples illustrate the crosslinking of the HDPE component of the extrudates of examples 15-22 and Comparative Examples 7-10, supra.

The pelleted silane-grafted HDPE extrudates of Examples 15-22 and Comparative Examples 7-10 were independently compression molded into 6×6×0.025 inch test plaques. A representative portion of the plaques were measure for percent gel content using Decalin extraction. To effect crosslinking of the silane-grafted HDPE in each of the remaining plaques, the plaques were placed in a water bath at about 90° C. for twelve hours. After crosslinking, samples were stamped out of the crosslinked plaques using a clicker press and die. Tensile, elongation and modulus at break were determined according to ASTM D-638 using a constant crosshead speed of 2.0 in/min for all samples. The physical and mechanical properties of the crosslinked samples are listed in Table 4 below.

TABLE 4

Physical Properties of Crosslinked Extrudates

| | Gel Content (%) | Tensile Stress at Auto Break (psi) | Elongation at Auto Break (%) | Modulus at Auto Break (psi) |
|---|---|---|---|---|
| Example | | | | |
| 23 | 11.8 | 3558 | 838 | 425 |
| 24 | 51 | 3446 | 652 | 529 |
| 25 | 78 | 3902 | 623 | 626 |
| 26 | 88 | 3865 | 567 | 682 |
| 27 | 13 | 2132 | 439 | 486 |
| 28 | 42 | 2488 | 248 | 1003 |
| 29 | 54 | 2097 | 151 | 1906 |
| 30 | 79 | 2074 | 75 | 2765 |
| Comparative Example | | | | |
| 11 | 15.12 | 2730 | 550 | 496 |
| 12 | 50.06 | 3460 | 570 | 516 |
| 13 | 64.9 | 3482 | 620 | 562 |
| 14 | 79.7 | 2586 | 232 | 1115 |

The measured percent gel content and results of the tensile, elongation and modulus at break determined according to ASTM D-638 are shown in FIGS. 1-4. FIG. 1 is a chart illustrating the percent gel content of the samples in Examples 23-30 and Comparative Examples 11-14. The gel content represents one measure of the degree of crosslinking in the sample, and by inference the degree of reaction of the silane. Comparative Examples 11-14, represented by Silquest® A-151, show a steady increase in gel content as the silane content is increased. Examples 23-30 also show similar trends, with Examples 23-26, represented by Silane A, exhibiting a slightly higher gel content than Comparative Examples 11-14 at molar equivalent loading levels. Examples 27-30, represented by Silane B, have a slightly lower gel content as compared to Comparative Examples 11-14 until silane concentration of 2.0% is reached, at which point the gel content is equivalent.

FIG. 2 is a chart illustrating the tensile stress at break of Examples 23-30 and Comparative Examples 11-14. Examples 23-26, Silane A, clearly show an advantage over Comparative Examples 11-14, Silquest® A-151, at loading levels below and above about 1%. Examples 27-30, Silane B, exhibited slightly lower tensile stress values at the same loading levels as Comparative Examples 11-14.

FIG. 3 is a chart illustrating the percentage elongation at break for Examples 23-26 and Comparative Examples 11-14. Examples 23-26, Silane A, show higher elongation than Comparative Examples 11-14, Silquest® A-151, at equivalent loading levels below and above 1.5%. Examples 27-30, Silane B, exhibit lower elongation than Comparative Examples 11-14.

FIG. 4 is a chart illustrating the modulus at break of the compounds produced in Examples 23-30 and Comparative Examples 11-14. Examples 23-26, Silane A, have equivalent performance to Comparative Examples 11-14, Silquest® A-151, except at loadings higher than 2%, where Examples 23-26, Silane A, show some improvement. Examples 27-30, Silane B, show a significantly increased modulus versus the comparative examples at loading levels greater than 0.5%.

In general, the silanes of the present invention show equivalent or improved performance as compared to currently employed silanes, and offer a significant benefit per the reduction in the amount of volatile organic compounds that are released.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A silane of general Formula (1):

$$[Y[-G(-SiX_u Z^b_v Z^c_w)_s]_r]_n \quad \text{(Formula 1)}$$

wherein:
each occurrence of G is a divalent straight chain alkyl of 3 to 18 carbon atoms or a chemical bond;
each occurrence of X is independently selected from the group consisting of $R^1O-$, $R^1C(=O)O-$ and $-O(R^{10}CR^{11})_f OH$, wherein each occurrence of $R^1$, $R^{10}$ and $R^{11}$ is independently R;
each occurrence of $Z^b$ is independently $(-O-)_{0.5}$ and $[-O(R^{10}CR^{11})_f O-]_{0.5}$, wherein each occurrence of $R^{10}$ and $R^{11}$ is independently R;
each occurrence of $Z^c$ is independently given by $-O(R^{10}CR^{11})_f O-$ wherein each occurrence of $R^{10}$ and $R^{11}$ is independently R;
each occurrence of R is independently an alkyl of $C_1$ to $C_4$ or hydrogen;
each occurrence of the subscript f is an integer from 1 to 15;
each occurrence of n is an integer from 1 to 100, with the proviso that when n is greater than 1, then v is a greater than 0 and all the valences for $Z^b$ have a silicon atom bonded to them;
each occurrence of the subscript u is an integer from 0 to 2;
each occurrence of the subscript v is an integer from 0 to 3;
each occurrence of the subscript w is an integer 0 or 1, with the proviso that u+v+2w=3;
each occurrence of the subscript r is 1;
each occurrence of the subscript s is 1; and
each occurrence of Y is independently $CH_2=CH-$, $CHR=CH-$ or $CR_2=CH-$, with the proviso that said silane contains at least one occurrence of $Z^b$ or $Z^c$.

2. The silane of claim 1 wherein $Z^b$ and $Z^c$ are divalent alkoxy groups derived from compounds selected from the group consisting of 1,3-propanediol, 2-methyl-1,3-propanediol, 1,3-butanediol, and 2-methyl-2,4-pentanediol.

3. A silane of 1 general Formula (1):

$$[Y[-G(-SiX_uZ^b_vZ^c_w)_s]_r]_n \quad \text{(Formula 1)}$$

wherein:
G is a divalent straight chain alkyl of 3 to 18 carbon atoms or a chemical bond;
R is an alkyl of $C_1$ to $C_4$ or H;
X is $R^1O-$ or $R^1C(=O)O-$, wherein each occurrence of $R^1$ is independently R;
each occurrence of $Z^b$ is independently $(-O-)_{0.5}$, wherein each occurrence of $R^{10}$ and $R^{11}$ is independently R;
each occurrence of $Z^c$ is independently of $R^{10}$ and $R^{11}$ is independently R;
each occurrence of the subscript f is an integer from 1 to 15;
n is 1;
u is 1;
v is 0;
w is 1;
r is 1;
s is 1; and
Y is $CH_2=CH-$, $CHR=CH-$ or $CR_2=CH-$.

4. The silane of claim 2 wherein X is selected from the group consisting of monovalent alkoxy groups derived from 1,3-propanediol, 2-methyl-1,3-propanediol, 1,3-butanediol, and 2-methyl-2,4-pentanediol.

5. A silane having the structure 1,3-propanedialkoxyethoxyvinylsilane, 1,3-propanedialkoxymethoxyvinylsilane, 1,3-propanedialkoxyisopropoxyvinylsilane, 2-methyl-2,4-pentanedialkoxymethoxyvinylsilane, 2-methyl-2,4-pentanedialkoxyethoxyvinylsilane, 2-methyl-2,4-pentanedialkoxyisopropoxyvinylsilane, 1,3-butanedialkoxymethoxyvinylsilane, 1,3-butanedialkoxyethoxyvinylsilane, 1,3-butanedialkoxyisopropoxyvinylsilane, neopentyldialkoxymethoxyvinylsilane, neopentyldialkoxyethoxyvinylsilane, neopentyldialkoxyisopropoxyvinylsilane, 2,3-dimethyl-2,3-butanedialkoxymethoxyvinylsilane, 2,3-dimethyl-2,3-butanedialkoxyethoxyvinylsilane, 2,3-dimethyl-2,3-butanedialkoxyisopropoxyvinylsilane, 2-methyl-1,3-propanedialkoxymethoxyvinylsilane, 2-methyl-1,3-propanedialkoxyethoxyvinylsilane, or and 2-methyl-1,3-propanedialkoxyisopropoxyvinylsilane.

6. The silane of claim 5 wherein the silane is selected from the group consisting of 2-methyl-1,3-propanedialkoxymethoxyvinylsilane, 2-methyl-1,3-propanedialkoxyethoxyvinylsilane, and 2-methyl-1,3-propanedialkoxyisopropoxyvinylsilane.

7. A mixture comprising a silane of claim 1 and a free radical generator.

8. A preblend comprising a silane of claim 1, a carrier polymer, and a free radical generator.

9. The preblend of claim 8 wherein the free radical generator is selected from the group consisting of benzoyl peroxide, dichlorobenzoyl peroxide, dipropionyl peroxide, t-butyl peroxyisobutyrate, lauroyl peroxide, organic peroxides including t-butyl peracetate, t-butyl peroxy-2-ethyl hexanoate, t-butyl peroxy isobutyrate, t-butyl peroxy benzoate, dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 2,5-di(peroxybenzoate)hexyl-3 and 1,3-bis(t-butyl-peroxyisopropyl)benzene; azo compounds including azobisisobutyronitrile, azoisobutylvaleronitrile and dimethyl azodiisobutyrate; ketone peroxides including methyl ethyl ketone peroxide, cyclohexanone peroxide and 1,1-bis(t-butylperoxy)-3,5,5-trimethylcyclohexane; hydroperoxides including t-butyl hydroperoxide, cumene hydroperoxide, diisopropylbenzene hydroperoxide, para-menthane hydroperoxide and 2,5-dimethylhexane-2,5-dihydroperoxide; dialkyl peroxides including di-t-butyl peroxide; and peroxy esters including t-butylperoxy acetate, t-butylperoxy benzoate, di-t-butyldiperoxy phthalate, 2,5-dimethyl-2,5-di(benzoyl peroxy)hexane, t-butylperoxy maleate and t-butylperoxy isopropyl carbonate.

10. The preblend of claim 9 further comprising at least one other additive selected from the group consisting of organometallic compounds, titanic acid esters, titanium chelate compounds, organic bases, inorganic acids, and fatty acids.

11. A crosslinkable polymer comprising a thermoplastic polymer having a hydrolysable silane of claim 1 grafted thereto.

12. A crosslinkable polymer hydrolysable silane of claim 5 grafted thereto.

13. The crosslinkable polymer of claim 12 wherein the silane is selected from the group consisting of 2-methyl-1,3-propanedialkoxymethoxyvinylsilane, 2-methyl-1,3-propanedialkoxyethoxyvinylsilane, and 2-methyl-1,3-propanedialkoxyisopropoxyvinylsilane.

14. The crosslinkable polymer of claim 12 wherein the polymer is a homopolymer or a copolymer selected from the group consisting of (i) ethylene copolymerized with one or more other ethylenically unsaturated monomer, ethylenically unsaturated carboxylic acid, or ethylenically unsaturated dicarboxylic acid anhydride, (ii) olefin-based rubber, and (iii) ionomer resin.

15. The crosslinkable polymer of claim 13 wherein the polymer is selected from the group consisting of polyethylene, polypropylene, polybutadiene, low density polyethylene, high density polyethylene, polyvinyl chloride, polyvinylidene chloride, ethylene propylene rubber, styrene butadiene rubber, chlorinated polyethylene, ethylene/propylene/5-ethylidene-2-norbornene, ethylene/1-octene/5-ethylidene-2-norbornene, ethylene/propylene/1,3-pentadiene, ethylene/1-octene/1,3-pentadiene, and ethylene/propylene/5-ethylidene-2-norbornene/piperylene.

16. A crosslinked polymer of claim 12.

17. A crosslinked polymer of claim 15.

18. A process for producing a crosslinked polymer which comprises:
(a) combining under substantially moisture-free conditions
a thermoplastic base polymer,
a solid carrier polymer,
a hydrolyzable silane of claim 5,
a free radical generator and, optionally,
a catalyst for the hydrolysis/condensation reactions of silane (iii) when silane (iii) is exposed to moisture;
(b) heating the combination resulting from step (a) at a temperature above the crystalline melting point of base polymer (i) to graft silane (iii) to base polymer (i); and,
(c) exposing the product resulting from step (b) to moisture to effect hydrolysis/condensation of grafted silane (iii) thereby providing crosslinked base polymer (i).

19. An article containing the crosslinked polymer of claim 16.

20. The article of claim 19 wherein the article is selected from the group consisting of PEX-b pipes, wire coatings, insulation jacketing for low- and medium voltage cables, foams for insulation, and heat shrinkable products.

* * * * *